(12) United States Patent
Castaneda et al.

(10) Patent No.: US 12,170,823 B2
(45) Date of Patent: Dec. 17, 2024

(54) SYSTEMS AND METHODS FOR SCHEDULING A COMMUNICATION SESSION BASED ON MEDIA ASSET COMMUNICATION DATA

(71) Applicant: Adeia Guides Inc., San Jose, CA (US)

(72) Inventors: Evangeline Castaneda, West Chester, PA (US); Sara Dever, Boothwyn, PA (US); Ti-Shiang Wang, Lexington, MA (US)

(73) Assignee: ADEIA GUIDES INC., San Jose, CA (US)

(*) Notice: Subject to any disclaimer, the term of this patent is extended or adjusted under 35 U.S.C. 154(b) by 496 days.

(21) Appl. No.: 17/923,879

(22) PCT Filed: Mar. 7, 2018

(86) PCT No.: PCT/US2018/021414
§ 371 (c)(1),
(2) Date: Nov. 7, 2022

(87) PCT Pub. No.: WO2019/172906
PCT Pub. Date: Sep. 12, 2019

(65) Prior Publication Data
US 2023/0188796 A1    Jun. 15, 2023

(51) Int. Cl.
*H04N 21/478* (2011.01)
*H04N 21/435* (2011.01)
(Continued)

(52) U.S. Cl.
CPC ......... *H04N 21/478* (2013.01); *H04N 21/435* (2013.01); *H04N 21/44008* (2013.01); *H04N 21/442* (2013.01); *H04N 21/4758* (2013.01)

(58) Field of Classification Search
CPC .......... H04N 21/435; H04N 21/44008; H04N 21/442; H04N 21/4758; H04N 21/478
See application file for complete search history.

(56) References Cited

U.S. PATENT DOCUMENTS

| 6,239,794 B1 | 5/2001 | Yuen et al. |
| 6,564,378 B1 | 5/2003 | Satterfield et al. |

(Continued)

FOREIGN PATENT DOCUMENTS

| EP | 2547117 A1 | 1/2013 |
| WO | 2008030298 A2 | 3/2008 |

(Continued)

*Primary Examiner* — Rong Le
(74) *Attorney, Agent, or Firm* — HALEY GUILIANO LLP

(57) ABSTRACT

Systems and methods are disclosed herein for scheduling a communication session for casting a vote relating to a media asset based on metadata of the media asset. A media guidance application may receive a frame of a media asset including voting information and metadata including communication data related to the voting information. The communication data may include a destination and a communication format. In response to receiving a command from a user input device, the media guidance application may extract the communication data from the metadata, generate a command to engage in communications using the communication data, and transmit the communication data and the command to a communication module. The media guidance application may then receive a trigger to engage in the communications. In response to the trigger, the media guidance application may instruct the communication module to execute the command to cast a vote.

18 Claims, 9 Drawing Sheets

(51) Int. Cl.
*H04N 21/44* (2011.01)
*H04N 21/442* (2011.01)
*H04N 21/475* (2011.01)

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,801 B2 | 10/2011 | Ellis et al. |
| 8,732,773 B1 | 5/2014 | Malaby et al. |
| 2002/0162115 A1 | 10/2002 | Bruckner et al. |
| 2002/0174430 A1 | 11/2002 | Ellis et al. |
| 2005/0251827 A1 | 11/2005 | Ellis et al. |
| 2006/0153161 A1* | 7/2006 | Nishikawa .......... H04L 65/1036 370/352 |
| 2010/0153885 A1 | 6/2010 | Yates |
| 2013/0007827 A1* | 1/2013 | Adam ................ H04N 21/8186 725/112 |
| 2013/0326552 A1 | 12/2013 | Adams |
| 2014/0289754 A1* | 9/2014 | Riethmueller ... H04N 21/44226 725/19 |
| 2018/0332328 A1* | 11/2018 | Sprenger ............. H04N 21/235 |

FOREIGN PATENT DOCUMENTS

| | | |
|---|---|---|
| WO | 2011130564 A1 | 10/2011 |
| WO | 2012099558 A1 | 7/2012 |

\* cited by examiner

SYSTEMS AND METHODS FOR SCHEDULING A COMMUNICATION SESSION BASED ON MEDIA ASSET COMMUNICATION DATA

CROSS-REFERENCE TO RELATED APPLICATIONS

This application is a national stage application under 35 U.S.C. § 371 of International Application PCT/US2018/021414, filed Mar. 7, 2018, which is hereby incorporated by reference herein in its entirety.

BACKGROUND

There are many reality-based television programs available to users. Many of these programs encourage users to cast votes for a participant in the program, such as a contestant in a talent competition program. Each of these programs accepts votes in a specific format, such as by phone call or text message to a particular phone number, usually displayed on screen while a participant is actively participating in the program. Users must remember or write down the number or other voting instructions, and remember to cast their vote at a time when votes are accepted by the program. Users may find themselves unable to cast their votes if they do not remember the voting information, or if they attempt to cast their vote at a time when votes are not accepted.

SUMMARY

Systems and methods are described herein for a media guidance application that schedules a communication session based on action information provided in a media asset. The media asset and associated metadata are monitored for action information. When received, the action information, including the destination, such as a phone number, and the communication format, such as telephony, are extracted. A signal is then monitored for a trigger to act using the extracted communication information.

As an example, while watching the talent competition program series "America's Got Talent," a media guidance application may receive a frame of video including voting information for a particular contestant. Metadata associated with the frame, or with the media asset as a whole, may also include the voting information. The media guidance application may receive user input to vote for the contestant. In response, the media guidance application may extract communication information from the voting information in the frame or the metadata. The voting information may also advise users that voting is not available until a specified time. The media guidance application may store the communication information until voting is available. The media guidance application may monitor a signal for a trigger to commence voting. If the trigger is detected, the media guidance application may send the communication information to a communication module and instruct the communication module to engage in communications using the communication information to cast the vote.

In some aspects, a media guidance application may receive, from a source, a media asset comprising media data and metadata. For example, the media guidance application may receive an episode of the talent competition program series "America's Got Talent." The media data may include at least one frame comprising action information. The metadata may include communication data corresponding to the action information, including destination information, a communication format, and an identification of a trigger to engage in a communication relating to the action information. The destination information may be, for example, a phone number to call to cast a vote for a contestant. The communication data may be the preferred method of communication, such as telephony. The trigger may be a specific signal indicating that an action period has begun.

The media guidance application may generate for display the at least one frame comprising the action information. For example, the media guidance application may generate a frame of the program series "America's Got Talent" for display which includes a banner across a portion of the screen in which a phone number or other voting instructions are displayed.

The media guidance application may receive, from a user input device, a communication command while the at least one frame is being generated for display. For example, when the voting information is displayed, a user may press a button on a remote control, or issue a voice command, to send a command to the media guidance application indicating that the user wishes to vote for the contestant whose voting information is displayed. In response to receiving the communication command, the media guidance application may determine that the at least one frame comprising action information is currently being generated for display.

The media guidance application may extract from the metadata the communication data. For example, the media guidance application may access the metadata associated with the frame and copy the metadata fields containing the phone number being displayed in the frame, and the preferred communication format to be used. The media guidance application may generate a command to engage in a communication session with a server based on the destination information using the communication format. For example, the media guidance application may generate a command to call the phone number using standard telephony.

The media guidance application may transmit the extracted communication data and the command to a communication module. For example, the media guidance application may transmit the phone number and the command to call the phone number to a smartphone associated with the user. Alternatively, the device on which the media guidance application runs may include a communication module to which the communication data and command may be transmitted. The media guidance application may store the extracted communication data and the command in a storage device associated with the communication module.

The media guidance application may monitor a signal for the trigger to engage in the communication relating to the action information. For example, the media guidance application may monitor the metadata of the media asset as it is received for the trigger identified in the communication data. In response to detecting the trigger after the at least one frame is generated for display, the media guidance application may instruct the communication module to execute the command to act for the user.

In some embodiments, the media guidance application may determine that the destination information in the communication data is incomplete. For example, the destination information may include a seven-digit telephone number, but not an area code. The media guidance application may perform image recognition on the at least one frame to identify a region of the at least one frame comprising the action information. For example, the media guidance application may capture the frame as a still image, and process the frame to identify a banner across a portion of the screen. Typically, such banners are located in a lower portion of the screen, and are rectangular in shape. The media guidance application may use such parameters to locate the banner. Alternatively, if the media asset typically displays voting information in a particular position or with particular dimensions, the media guidance application may retrieve such information from a source, and use parameters defined therein to locate the voting information.

The media guidance application may process the identified region of the at least one frame to retrieve from the identified region a remaining portion of the communication data to complete the destination information. For example, the media guidance application, after locating the voting information on the screen, may use character recognition to extract the portion of the destination information, such as the area code, from the information being displayed.

In some embodiments, the media guidance application may extract or generate the metadata by processing the at least one frame to access the metadata. For example, the media guidance application may process the frame to locate the metadata, such as in a header region of the media data packet or packets associated with the frame. The media guidance application may parse the metadata to identify the communication data. For example, the media guidance application may analyze the metadata field names or other identifiers to locate specific items of metadata relating to the voting information. Once located, the media guidance application may extract as communication data the data contained within the fields. The media guidance application may store the communication data in a storage device associated with the media device on which the media guidance application resides.

In some embodiments, the communication module comprises a plurality of communication interfaces, each communication interface of the plurality of communication interfaces being configured to use a different communication format. For example, the communication module may include a telephone connection configured to make phone calls, and an Internet connection configured for accessing Internet servers.

The communication format specified in the communication data may be a first communication format. For example, the communication data may specify telephony as the preferred communication format when the destination information comprises a phone number. The media guidance application may generate the command to engage in the communication session with the server based on the extracted communication data by retrieving from the communication module a list of available communication formats for which each of the plurality of communication interfaces is configured. For example, the media guidance application may access the communication module to retrieve a listing of each communication interface and the format for which it is configured. Continuing the example above, the media guidance application may retrieve from the communication module a list including telephony, and Internet formats.

The media guidance application may determine that none of the plurality of communication interfaces is configured to use the first communication format. For example, the communication format may be telephony, while none of the interfaces of the communication module is configured for telephony. The media guidance application may determine a second communication format for which at least one of the plurality of communication interfaces is configured. For example, where the communication format is telephony, and where the plurality of interfaces includes interfaces configured to SMS and Internet formats, the media guidance application may determine that voice-over-IP ("VOIP") may be used in place of telephony, and that the communication interface configured for Internet formats may establish a VOIP connection. The media guidance application may convert the communication data from the first communication format to the second communication format. For example, the media guidance application may convert the phone number to a VOIP session using, for example, Session Initiation Protocol ("SIP").

In some embodiments, the signal is received from the source from one of an out-of-band channel, data sent in a vertical blanking interval, and the metadata. The media guidance application may monitor the signal for the trigger to engage in the communication relating to the action information by periodically comparing the signal from the source with the identification of the trigger to engage in a communication relating to the action information. For example, the media guidance application may store the identification of the trigger received as part of the communication data and perform a correlation analysis, such as waveform correlation, to determine if the trigger has been received. Alternatively, the trigger may be digital, such as a change in metadata value from 0 to 1, or from FALSE to TRUE. The media guidance application may periodically access the metadata to determine if the trigger value is present in metadata.

In some embodiments, the media asset comprises a talent competition program, such as "America's Got Talent" and the identification of the trigger comprises a contestant associated with the voting information. The media guidance application may receive an indication of the start of the performance of the contestant. For example, the media guidance application may receive a signal or metadata field indication that a contestant has begun performing.

The media guidance application may determine, based on the metadata, that an action period begins at the end of the performance. For example, the metadata may include a field indicating that votes for the current contestant are accepted only after the contestant has finished performing. The media guidance application may determine that the performance has ended. For example, the media guidance application may receive a signal in an out-of-band channel, or may receive metadata indicating the end of a performance. In response to determining that the performance has ended, the media guidance application may generate, at the media device, the signal. For example, after receiving a signal or metadata indicating the end of a performance, the media guidance application may generate the identified trigger signal.

In some embodiments, the media guidance application may determine that the performance has ended by performing facial recognition on the contestant to generate a first set of facial characteristics. For example, the media guidance application may capture a frame of the performance as a still image. The media guidance application may then process the image using facial recognition to identify the characteristics of the face of the contestant. The media guidance application may process several frames of the performance to compile facial characteristics of the contestant from multiple angles. The media guidance application may periodically detect a frame of the media asset comprising an individual or person. For example, the media guidance application may periodically process a frame to determine if an individual or person is being displayed prominently in the frame, such as when the contestant is performing. The media guidance application may use factors such as the position and apparent size, proximity, or other video characteristics indicating that the individual is being featured in the frame. The media guidance application may perform facial recognition on the individual to generate a second set of facial characteristics. The media guidance application may process the individual using facial recognition in a similar way as above to generate facial characteristics of the individual in the frame. The media guidance application may compare the first set of facial characteristics with the second set of facial characteristics to determine if the contestant has finished performing. For example, the media guidance application may compare the facial characteristics of the contestant established at the start of the performance with the characteristics of the individual displayed in the frame. In response to determining that the second set of facial characteristics does not match the first set of facial characteristics, the media guidance application may determine that the performance has ended.

In some embodiments, the media guidance application may determine that the performance has ended by receiving a second indication of the start of a performance of a second contestant. For example, the media guidance application may receive another signal as described above, indicating the start of a performance. If the media guidance application has already received such a signal, receipt of a second signal, indicating the start of a second performance, may also indicate the end of the first performance.

In some embodiments, the communication module executes the command to act for the user by retrieving, from the storage device associated with the communication module, the stored communication data. For example, the media guidance application may access a memory module associated with the communication module and retrieve communication data stored therein. The communication module may extract, from the stored communication data, the destination information and the communication format. For example, the media guidance application may process the stored communication data to determine the destination for the communication session needed to be established. The communication module may access a communication interface of the communication module, the communication interface being configured to use the communication format. For example, if the destination information is a phone number, the media guidance application may access a communication interface of the communication module configured to make phone calls, and may transfer the destination phone number to the communication module. The communication module may input the destination information to the communication interface. For example, the communication module, after receiving the destination phone number from the media guidance application, may input the destination phone number into the communication interface. The communication module may initiate at the communication interface a communication session to a server associated with the destination information. For example, the communication module may activate the telephone communication interface to dial the destination phone number.

In some embodiments, the media asset comprises a sporting event, and the identification of the trigger comprises one of a team and a player associated with the voting information. The media guidance application may receive an indication of the team or player becoming active in the sporting event. For example, if the media asset is a baseball game between the New York Yankees and the Boston Red Sox, the media guidance application may, at the start of an inning, receive an indication that the Yankees are the batting team, or that the Red Sox are the fielding team. The media guidance application may also receive an indication of a particular player coming up to bat, such as Yankees outfielder Aaron Hicks.

The media guidance application may determine, based on the metadata, that an action period begins at the time the team or player becomes active in the sporting event. A team may become active when the team is on the offensive, such as becoming the batting team in a baseball game. A player may become active when the player is in control of the next play in the game, such as when a player is up at bat in a baseball game, or in possession of the ball in a football game. The media guidance application may also determine, based on the metadata, that the action period ends at a specified time. For example, the metadata may include a field indicating that votes for the outcome of the current player's actions are accepted only between the time the player comes up to bat and the time the first pitch is thrown to that player. The media guidance application may receive a signal in an out-of-band channel, or may receive metadata indicating the temporal boundaries of the action period. The media guidance application may compare a current time to the specified time to determine if the specified time has passed and, in response to determining that the specified time has passed, the media guidance application may generate, at the media device, the signal. For example, after receiving a signal or metadata indicating the end of the action period, the media guidance application may generate the identified trigger signal.

In some embodiments, the media asset comprises an audio program, such as a radio program or podcast, and the identification of the trigger comprises a particular sound or keyword spoken by a host of the audio program. For example, if the media asset is a radio program during which the radio station offers listeners a chance to win tickets to a concert, the media guidance application may receive an indication that the listener should call. For example, the media guidance application may identify a sound effect indicating that a listener should call now to try to win the tickets. Alternatively or additionally, the media guidance application may, using a speech recognition module, detect that a host of the media asset announced that listeners should call now, or at a specific time, to try to win the tickets. The media guidance application may determine, based on metadata, that the action period begins when the sound effect or announcement is detected. The metadata may include a sample of the sound effect, or text or keywords which, when detected in the speech of a host of the media asset, indicate the start of the calling period.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for a media guidance application that schedules a communication session based on action information provided in a media asset. The media asset and associated metadata are monitored for action information. When received, the action information, including the destination, such as a phone number, and the communication format, such as telephony, are extracted. A signal is then monitored for a trigger to act using the extracted communication information.

As an example, while watching the talent competition program series "America's Got Talent," a media guidance application may receive a frame of video including voting information for a particular contestant. Metadata associated with the frame, or with the media asset as a whole, may also include the voting information. The media guidance application may receive user input to vote for the contestant. In response, the media guidance application may extract communication information from the voting information in the frame or the metadata. The voting information may also advise users that voting is not available until a specified time. The media guidance application may store the communication information until voting is available. The media guidance application may monitor a signal for a trigger to commence voting. If the trigger is detected, the media guidance application may send the communication information to a communication module and instruct the communication module to engage in communications using the communication information to cast the vote.

Figure 1:
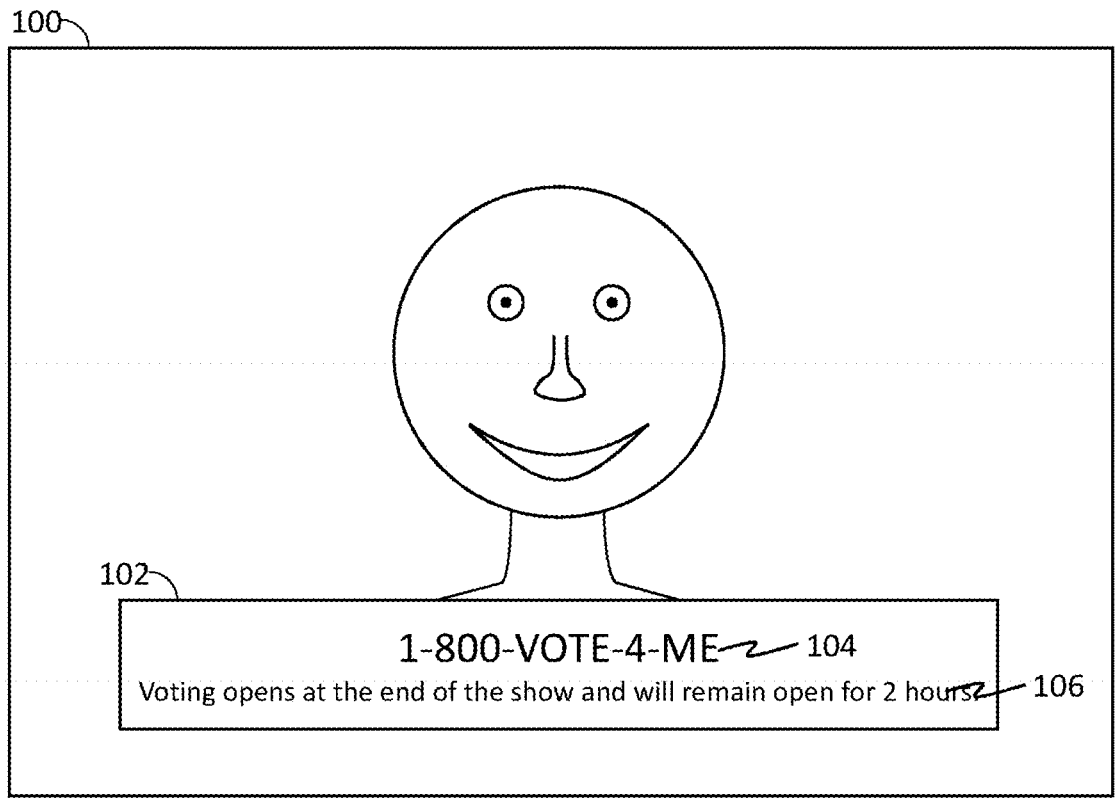
FIG. 1 shows an exemplary frame of a media asset comprising action information and several examples of action information according to an embodiment of the disclosure.
Figure 1:
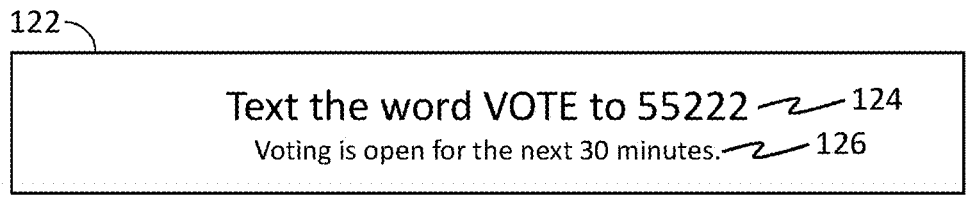
Figure 1:
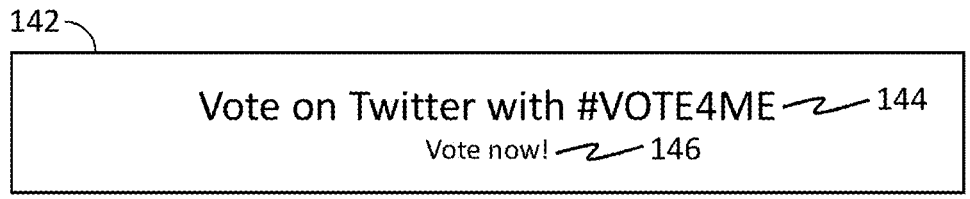
Figure 1:
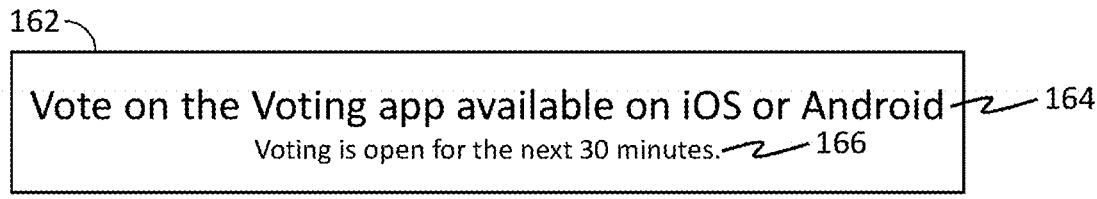
Figure 1:
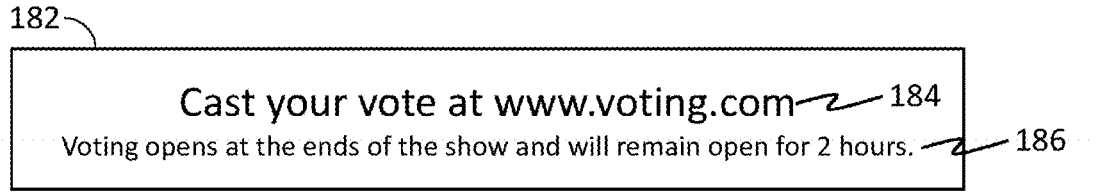

FIG. 1 shows an exemplary display screen including action information, as well as several examples of action information according to some embodiments of the disclosure. While viewing a media asset comprising a talent competition program, voting information is often displayed for a contestant during the contestant's performance in the program. Display screen 100 displays the media asset. At least once during each contestant's performance, the program may include voting information that a user may use to vote for the contestant. The voting information is often displayed in a banner in the lower portion of the screen, as exemplified by action information banner 102. Action information banner 102 contains communication destination information 104, which is a phone number to be called by a user to vote for the contestant. Action information banner 104 also includes timing information 106. Timing information 106 informs the user of when votes may be cast. For example, timing information 106 informs the user that votes may be cast during a two-hour period beginning at the end of the program. Other examples are shown in action information banners 122, 142, 162, and 182. Action information banner 122 contains communication destination information 124, which is an instruction to send a text message to the SMS short code number to 55222. Action information banner 122 also includes timing information 126, which informs the user that votes may be cast for a period of thirty minutes beginning at the time the banner appeared on display screen 100. Action information banner 142 contains communication destination information 142, which is an instruction to use the social media platform Twitter® to vote by "tweeting" a message including a specific hashtag, "#VOTE4ME". Timing information 146 informs the user that votes may be cast immediately, and does not specify and end to the voting period. Action information banner 162 contains communication destination information 164, which instructs the user to use a smartphone app to cast their vote, and timing information 166 indicating that votes may be cast for the next thirty minutes. Action information banner 182 contains communication destination information 184 instructing the user to cast their vote on a website, and timing information 186, which informs the user that votes may be cast during a two-hour period beginning at the end of the program.

The media guidance application may be configured to detect when action information banner 102, 122, 142, 162, 182 is being displayed on display screen 100. For example, the media guidance application may include a video processing module, implemented in software, hardware, or firmware, that can identify elements in a video frame. The media guidance application may, alternatively or additionally, include an image processing module, implemented in software, hardware, or firmware, that can capture a single frame of video as a still image and identify elements within the captured still image. The media guidance application may be provided with parameters by which to identify the action information banner 102, 122, 142, 162, 182. For example, the media guidance application may be provided with position, size, and appearance parameters of the action information banner 102, 122, 142, 162, 182. The media guidance application may receive the parameters in metadata associated with the media asset. Alternatively, the parameters may be included in electronic program guide data. As another alternative, the media guidance application may be configured to learn the parameters while the media asset is being displayed. The media guidance application may process the media asset to track the appearance, disappearance, and movement of various elements in the media asset, and be configured to identify an overlay of a particular size, shape, and location, and containing text, as an action information banner.

The media guidance application may also receive, concurrently with, or as part of, the media asset, metadata describing the action information. For example, the metadata associated with the first frame of the media asset in which the action information banner is displayed may include data fields corresponding to the destination information and communication format. The metadata may also identify a specific trigger which, when later received by the media guidance application, indicates that a voting period has begun and that votes may be cast. The trigger may be a particular value in a metadata field, a waveform, digital packet, or any other suitable unique signal.

The media guidance application may be configured to receive user input from a user input device. While watching a media asset comprising the talent competition program series "America's Got Talent," the user may wish to vote for a contestant. The user may press a button on a user input device to indicate their desire to vote for the contestant, or may issue a voice command, such as an utterance of the word "vote." For example, the user input device may be a remote control, smartphone, tablet, microphone, or other user input device, and the user equipment on which the media guidance application resides may include a receiver module configured to receive signals from the user input device. The user input device may transmit signals via infrared, WiFi, Bluetooth®, or any other suitable signaling protocol. Upon receipt of the signal, the media guidance application may process the signal and determine what button was pressed, or what voice command was issued. In response to determining that the button pressed is associated with a voting command, or that the voice command issued is associated with a voting command, the media guidance application may determine if action information has been received. For example, the media guidance application may store, in a memory storage device, a state flag or Boolean variable indicating whether action information has been received. When the media asset is first received, the media guidance application may set the value of the flag or Boolean variable to FALSE. When action information is displayed on display screen 100, the media guidance application may set the value of the flag or Boolean variable to TRUE.

When the media guidance application receives the user input signal indicating the user's desire to vote, the media guidance application may access the memory storage device and determine the value of the state flag or Boolean variable. If the value is FALSE, the media guidance application may take no action, or may be configured to generate for display a message indicating that action information is not available. If the value is TRUE, the media guidance application may access metadata received with the frame of the media asset in which the action information banner 102, 122, 142, 162, 182 first appeared which may contain the action information. The media guidance application may extract the action information from the metadata. For example, the media guidance application may copy the action information to a memory location in a memory storage device. The action information may include destination information, such as a phone number or SMS short code, and a communication format, such as telephony, or SMS.

The media guidance application may be configured to generate a command to engage in a communication session with a server based on the destination information and communication format. For example, the media guidance application may generate a command to initiate a phone call to a telephone exchange server in order to connect with the destination phone number. The media guidance application may be configured to transmit the extracted communication data and the command to a communication module. For example, the device on which the media guidance application resides may include a communication module communicatively coupled with the media guidance application. The media guidance application may communicate the communication data and command to the communication module in order to effect communication. Alternatively, the media guidance application may transmit the communication data and command to a stand-alone communications device, such as a user's cell phone, smartphone, PDA, computer, or any other device capable of external communications.

The media guidance application may be configured to store the communication data and command in a storage device associated with the communication module. For example, the media guidance application may instruct the communication module to store the communication data and command in a memory storage device communicatively coupled to the communication module. In some cases, where the communication module is part of the device on which the media guidance application resides, the media guidance application may share a storage device with the communication module, or the communication module may have an independent storage device. Alternatively, where the communication module is a stand-alone device, the media guidance application may transmit to the communications device a storage instruction along with the communication data and command, thereby instructing the stand-alone device to store the communication data and command in a local memory storage device of the stand-alone device.

The media guidance application may be configured to monitor a signal for a trigger identified in the metadata of the media asset as part of the action information. For example, the media guidance application may monitor an out-of-band channel for a signal corresponding to an identified trigger waveform. As another example, the media guidance application may monitor the metadata of the media asset for an identified trigger data field. The media guidance application may also monitor data transmitted in the vertical blanking interval, EPG data, or any other suitable transmission or data stream for the trigger signal. If the trigger is detected, the media guidance application may be configured to instruct the communication module to execute the command to act. For example, after detecting the trigger, the media guidance application may transmit a command to the communication module to access the memory storage location in which the communication data and command are stored, retrieve the communication data and command, and execute the command.

In some embodiments, the media guidance application may determine that the communication data is incomplete. For example, the communication format specified in the communication data may be telephony, but the destination information may include only a seven-digit phone number without an area code. As another example, the communication data may include destination information and a communication format, but may not include timing information. In order to complete the communication data, the media guidance application may be configured to perform image recognition on a frame of the media asset in which the voting information is displayed. The media guidance application may identify a region on the frame in which the voting information is displayed. As described above, the media guidance application may include a video processing module or image processing module, implemented in software, hardware, or firmware, that can identify elements in a video frame or in a still image capture of a video frame. The media guidance application may be provided with parameters by which to identify the action information banner 102, 122, 142, 162, 182, such as position, size, and appearance parameters. The media guidance application may receive the parameters in metadata associated with the media asset. Alternatively, the parameters may be included in electronic program guide data. Alternatively, the media guidance application may be configured to learn the parameters while the media asset is being displayed. The media guidance application may process the media asset to track the appearance, disappearance, and movement of various elements in the media asset, and be configured to identify an overlay of a particular size, shape, and location, and containing text, as an action information banner. Once the media guidance application has identified the region of the frame, the media guidance application may be configured to retrieve a portion of the communication data needed to complete the communication data. For example, the media guidance application may use character recognition to extract the complete phone number from action information banner 102.

In some embodiments, the media guidance application may be configured to extract the communication data from the metadata by processing a frame to access the metadata. For example, the media asset may be in an MPEG-2 format, and the media guidance application may run the frame through a Program and System Information Protocol ("PSIP") analyzer to access the metadata contained in the MPEG-2 frame. The media guidance application may be configured to parse the metadata to identify the communication data. For example, the media guidance application may search the metadata for data fields relating to the communication information. For example, the media guidance application may compare the values of each data field to a particular type of character string, such as "###-###-####" for a phone number, using regular expressions. Once identified, the media guidance application may be configured to store the communication data in a storage device associated with the device on which the media guidance application resides.

In some embodiments, the communication module may include a plurality of communication interfaces. Each communication interface may be configured to use a different communication format. For example, the communication module may include four communication interfaces. One communication interface may be configured for telephony. A second communication interface may be configured for SMS messaging. A third communication interface may be configured for email messaging. A fourth communication interface may be configured for Internet protocols such as TCP/IP, HTTP, and VOIP.

The communication format specified in the communication data may be a first format, such as telephony, which may or may not be a format for which there is a configured communication interface in the communication module. When generating the command to engage in a communication session, the media guidance application may be configured to retrieve from the communication module a list of available communication formats for which there is a configured communication interface. For example, the media guidance application may transmit a request to the communication module. The communication module may, in response to the request, access a configuration file or other data structure containing a manifest of communication formats for which the plurality of communication interfaces is configured. The media guidance application may be configured to determine that none of the available formats contained in the list received from the communication module is the communication format specified in the communication data. For example, the communication format may be telephony, and the communication module includes interfaces configured for SMS messaging, email messaging, and Internet protocols such as TCP/IP, HTTP, and VOIP. The media guidance application may be configured to determine a second communication format for which at least one of the communication interfaces is configured. Continuing the above example, the media guidance application may determine that, while telephony is not an available format, VOIP is an available format and is comparable to telephony. The media guidance application may, for example, be provided with a database, table, list, or other data structure detailing comparable communication formats for each possible communication format. The media guidance application may be configured to convert the communication data from the first communication format to the second communication format. For example, the media guidance application may convert a telephone number to a Session Initiation Protocol ("SIP") message to initiate a VOIP session with the specified phone number.

In some embodiments, the media asset is a talent competition program, and the identification of the trigger comprises a contestant associated with the action information. The media guidance application may be configured to receive an indication of the start of a performance of the contestant. For example, the media guidance application may receive metadata indicating that the performance of a contestant has begun. The media guidance application may determine, based on metadata, that an action period begins at the end of the performance. The media guidance application may be configured to determine that the performance has ended. For example, the media guidance application may determine that a performance has ended based on receipt of a second indication of the start of a performance of another contestant.

As another example, the media guidance application may perform facial recognition on the contestant to generate a first set of facial characteristics. The media guidance application may capture a frame of the performance as a still image and process the image using facial recognition to identify the characteristics of the face of the contestant. The media guidance application may process several frames of the performance to compile facial characteristics of the contestant from multiple angles. The facial characteristics may be stored in a memory storage device. The media guidance application may periodically detect a frame of the media asset comprising an individual. For example, the media guidance application may periodically process a frame to determine if an individual is being displayed prominently in the frame, such as when the contestant is performing. The media guidance application may use factors such as the position and apparent size, proximity, or other video characteristics indicating that the individual is being featured in the frame. The media guidance application may perform facial recognition on the individual to generate a second set of facial characteristics. The media guidance application may process the individual using facial recognition in a similar way as above to generate facial characteristics of the individual in the frame. The media guidance application may compare the first set of facial characteristics with the second set of facial characteristics to determine if the contestant has finished performing. For example, the media guidance application may compare the facial characteristics of the contestant established at the start of the performance with the characteristics of the individual displayed in the frame. In response to determining that the second set of facial characteristics does not match the first set of facial characteristics, the media guidance application may determine that the performance has ended.

The media guidance application may be configured to generate the signal including the identified trigger in response to determining that the performance has ended.

In some embodiments, the communication module may be configured to execute the command to cast a vote for the user by retrieving, from the storage device associated with the communication module, the stored communication data. For example, the communication module may access a memory location in the storage device and retrieve the data stored at the location, the data corresponding to the communication data. The communication module may extract, from the communication data, the destination information and the communication format. For example, the communication module may initialize two separate variables, one for destination information and one for communication format. The communication module may assign the destination information as the value of the destination information variable, and the communication format as the value of the communication format variable. The communication module may access a communication interface that is configured to use the communication format, and input the destination information to the communication interface. For example, the communication module may access a communication interface configured for telephony and input a phone number to the interface. The communication module may initiate at the communication interface a communication session to a server associated with the destination information. For example, the communication module may initiate a communication session with a telephone exchange server.

In some embodiments, the media asset is a sporting event, and the identification of the trigger is a team or player associated with the action information. The media guidance application may receive an indication of the team or player becoming active in the sporting event. For example, the media asset may be a baseball game between the New York Yankees and the Boston Red Sox. The media guidance application may receive an indication, for example through metadata, at the start of an inning, that the Yankees are now the batting team, and the Red Sox are now the fielding team. The media guidance application may also receive an indication of a particular player coming up to bat, such as Yankees outfielder Aaron Hicks.

The media guidance application may determine, based on the metadata, that an action period begins at the time the team or player becomes active in the sporting event, and that the action period ends at a specified time. For example, the metadata may include a field indicating that votes for the outcome of the current player's actions are accepted only between the time the player comes up to bat and the time the first pitch is thrown to that player. The media guidance application may receive a signal in an out-of-band channel, or may receive metadata indicating the temporal boundaries of the action period. The media guidance application may compare a current time to the specified time to determine if the specified time has passed and, in response to determining that the specified time has passed, the media guidance application may generate, at the media device, the signal. For example, after receiving an indication of the end of the action period, the media guidance application may generate the identified trigger signal.

In some embodiments, the media asset comprises an audio program, such as a radio program or podcast, and the identification of the trigger comprises a particular sound or keyword spoken by a host of the audio program. For example, if the media asset is a radio program during which the radio station offers listeners a chance to win tickets to a concert, the media guidance application may receive an indication that the listener should call. For example, the media guidance application may identify a sound effect indicating that a listener should call now to try to win the tickets. Alternatively or additionally, the media guidance application may, using a speech recognition module, detect that a host of the media asset announced that listeners should call now, or at a specific time, to try to win the tickets. The media guidance application may determine, based on metadata, that the action period begins when the sound effect or announcement is detected. The metadata may include a sample of the sound effect, or text or keywords which, when detected in the speech of a host of the media asset, indicate the start of the calling period.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device,"

"user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
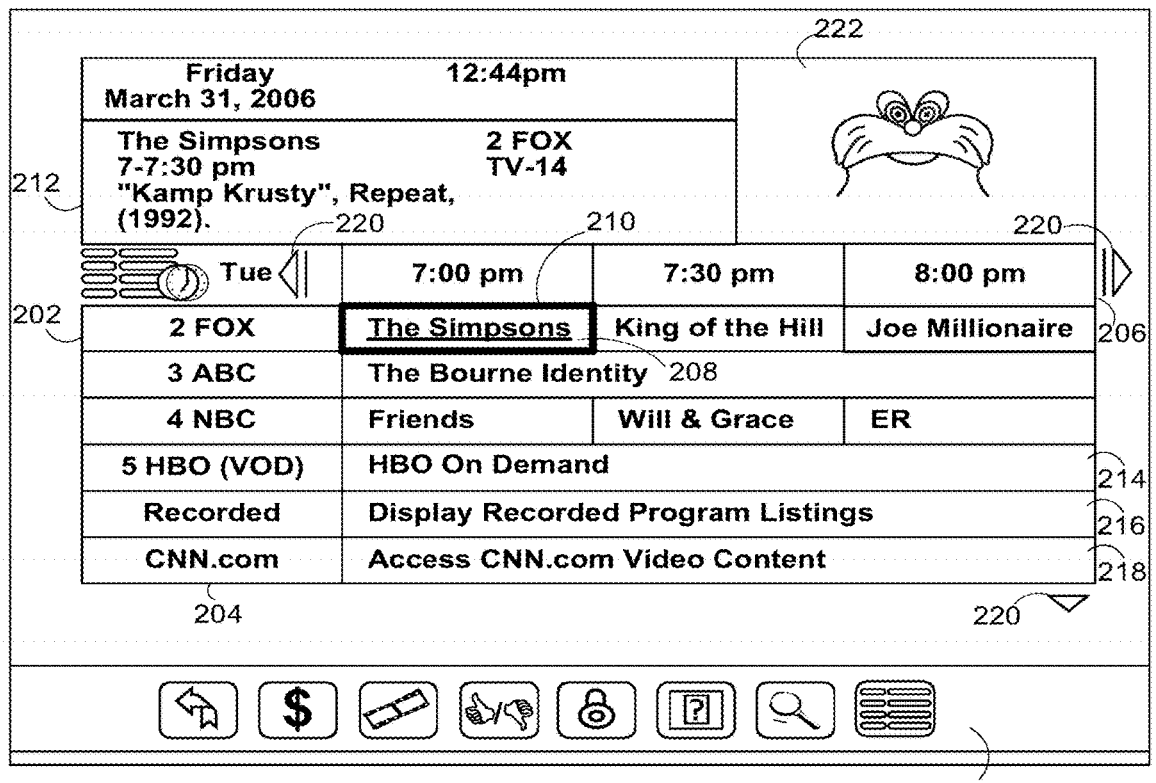
FIG. 2 shows an illustrative display screen that may be used to provide media guidance data according to an embodiment of the disclosure.
Figure 3:
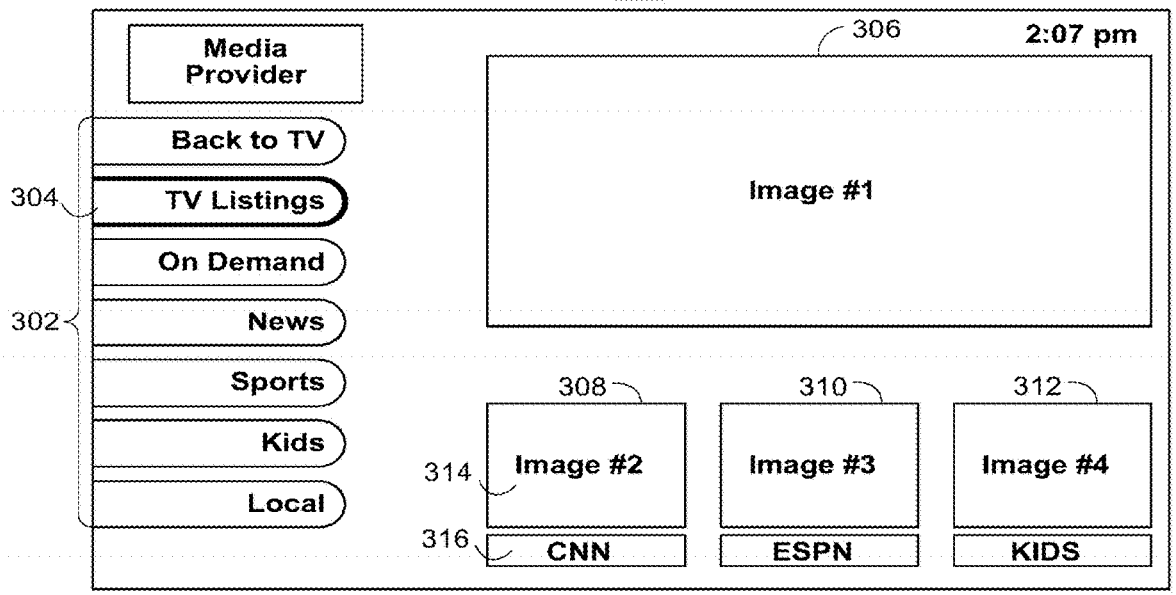
FIG. 3 shows an illustrative display screen that may be used to provide media guidance data according to an embodiment of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
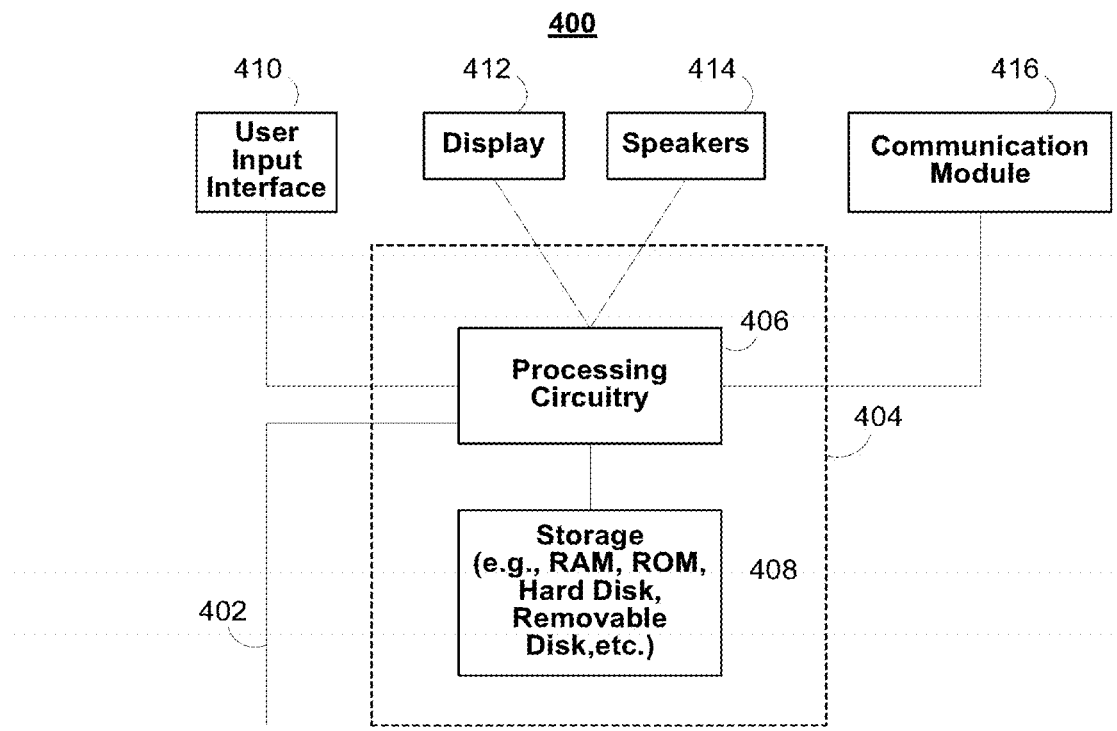
FIG. 4 shows a generalized embodiment of a stand-alone device according to an embodiment of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

Communication module 416 may be provided as integrated with other elements of user equipment device 400, or may be a stand-alone unit. The communication module 416 may allow or enable communication between the user equipment device 400 and at least one remote communication server, such as communication server 520, described below with reference to FIG. 5. For example, the communication module 416 may be a telephone which allows for communication between the user equipment device 400 and a telephone exchange server, which may ultimately communicate with a recipient having a particular phone number. The communication module 416 may include any number of communication interfaces. Each communication interface may be configured for a different communication format. For example, communication module 416 may include interfaces configured for telephony, Short Message Service ("SMS") messaging, Multimedia Messaging Service ("MMS") messaging, email (using Simple Mail Transfer Protocol ("SMTP")), Voice-Over-IP ("VOIP"), accessing social media platforms and other URLs on the Internet, and any other suitable communication format. The communication module 416 may also be configured to access applications on a user's smartphone, including communication applications, social media applications, Internet browsing applications, and any other applications to which the user has allowed access.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
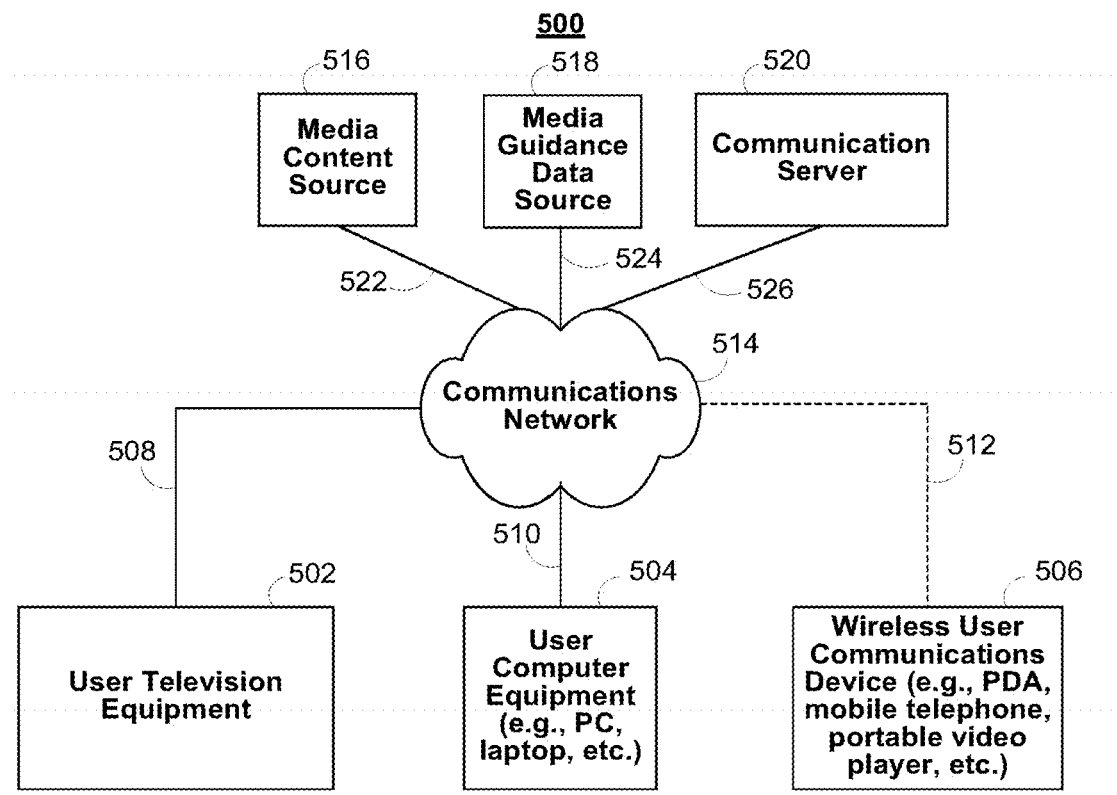
FIG. 5 shows a specific implementation of user devices according to an embodiment of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516, media guidance data source 518, and communication server 520 coupled to communications network 514 via communication paths 522, 524, and 526, respectively. Paths 522, 524, and 526 may include any of the communication paths described above in connection with paths 508, 510, and 512. Communications with the content source 516, media guidance data source 518, and communication server 520 may be exchanged over one or more communications paths, but are shown as a single path in FIG. 5 to avoid overcomplicating the drawing. In addition, there may be more than one of each of content source 516, media guidance data source 518, and communication server 520, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 and communication server 520 with user equipment devices 502, 504, and 506 are shown as through communications network 514, in some embodiments, sources 516 and 518 and communication server 520 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

Communication server 520 may provide communication between user equipment devices 502, 504 and 506 and a recipient using a particular communication format. Communication server 520 may be any type of communication server, and may receive communications from communication module 416 and route the communications to a destination according to the destination information contained in the communications. For example, the communication server 520 may be a telephone exchange server, and may route a phone call from the communication module 416 to the destination associated with the phone number. Alternatively, the communication server 520 may be a VOIP server, and may route a VOIP call from communication module 416 to the destination associated with the VOIP address or phone number associated with the communications. Communication server 520 may also be an Internet server associated with a social media platform such as Twitter®. Communication server 520 may receive a "tweet" from communication module 416, and route the "tweet", as part of a notification, to a user associated with the content of the "tweet". Communication server 520 may be any other type of server configured to accept, process, route, or otherwise handle any or all of the communication formats listed above in relation to communication module 416.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 616 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
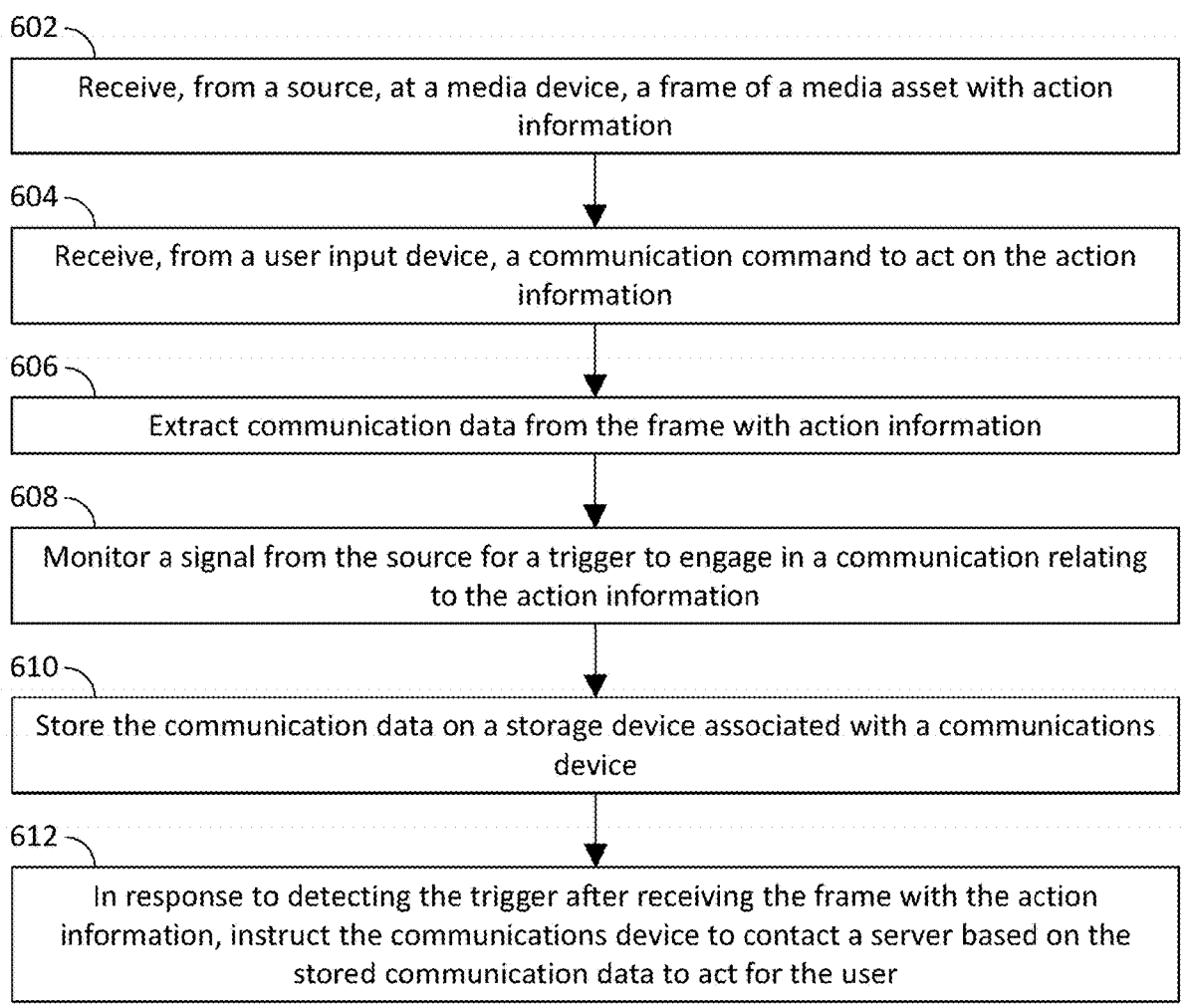
FIG. 6 is a flowchart representing a process for scheduling a communication session according to an embodiment of the disclosure.

FIG. 6 is a flowchart representing an illustrative process for scheduling a communication session in accordance with some embodiments of the disclosure. The flowchart in FIG. 6 represents a process 600 implemented on control circuitry 404 for scheduling a communication session according to an embodiment of the disclosure. It should be noted that process 600 or any action thereof could be performed on, or provided by, any of the devices shown in FIGS. 4-5. For example, process 600 may be executed by control circuitry 404 (FIG. 4) as instructed by a media guidance application implemented on a user device (e.g., user equipment devices 502, 504, and/or 506 (FIG. 5), as well as display screen 100 (FIG. 1)) in order to schedule a communication session. In addition, one or more actions of process 600 may be incorporated into or combined with one or more actions of any other process or embodiment described herein.

At 602, control circuitry 404 may receive, from a source, a frame of a media asset with action information. For example, control circuitry 404 may receive a media asset from a media content source such as media content source 516. The media asset may be comprised of a series of frames, and each frame may have metadata associated therewith.

At 604, control circuitry 404 may receive, from a user input device, a communication command to act on the action information. For example, control circuitry 404 may receive a communication command from a user input device at user input interface 410. For example, the user input device may be a remote control, smartphone, tablet, microphone, or other user input device, and control circuitry 404 may include or be communicatively coupled with a receiver module, such as user input interface 410, configured to receive signals from the remote control. The user input device may transmit signals via infrared, WiFi, Bluetooth®, or any other suitable signaling protocol. Upon receipt of the signal, control circuitry 404 may process the signal and determine what button was pressed, or what voice command was issued. For example, control circuitry 404 may compare the received signal to a database of user input signals to determine what button on the user input device was pressed, or what voice command was issued.

At 606, in response to determining that a button associated with voting was pressed, or that a voice command associated with voting was issued, control circuitry 404 may extract communication data from the frame with action information. For example, control circuitry 404 may access metadata of the frame or media asset and copy the action information to a memory location in a memory storage device, such as storage 408. The action information may include destination information, such as a phone number or SMS short code, and a communication format, such as telephony, or SMS.

At 608, control circuitry 404 may monitor a signal from the source for a trigger to engage in a communication relating to the action information. For example, control circuitry 404 may periodically analyze the signal to determine if a particular trigger has been transmitted. The signal may be received from media content source 516 or media guidance data source 518, via communications network 514, as part of the media asset, as a particular metadata field associated with the media asset, in a vertical blanking interval, or in an out-of-band transmission.

At 610, control circuitry 404 may store the communication data on a storage device associated with a communications device. For example, control circuitry 404 may extract or copy the communication data from the voting information and store it in a memory location in a storage device associated with the communication module 416. If communication module 416 is integrated into control circuitry 404, the communication data may be stored in storage 408.

At 612, in response to detecting the trigger after receiving the frame with action information, control circuitry 404 may instruct the communications device to contact a server based on the stored communication data to act for the user. For example, control circuitry 404 may determine that the trigger has been transmitted in the monitored signal. In response, control circuitry 404 may then transmit an instruction to communication module 416 to initiate a communication session using the communication data.

It is contemplated that the actions or descriptions of FIG. 6 may be used with any other embodiment of this disclosure. In addition, the actions and descriptions described in relation to FIG. 6 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 6.

Figure 7:
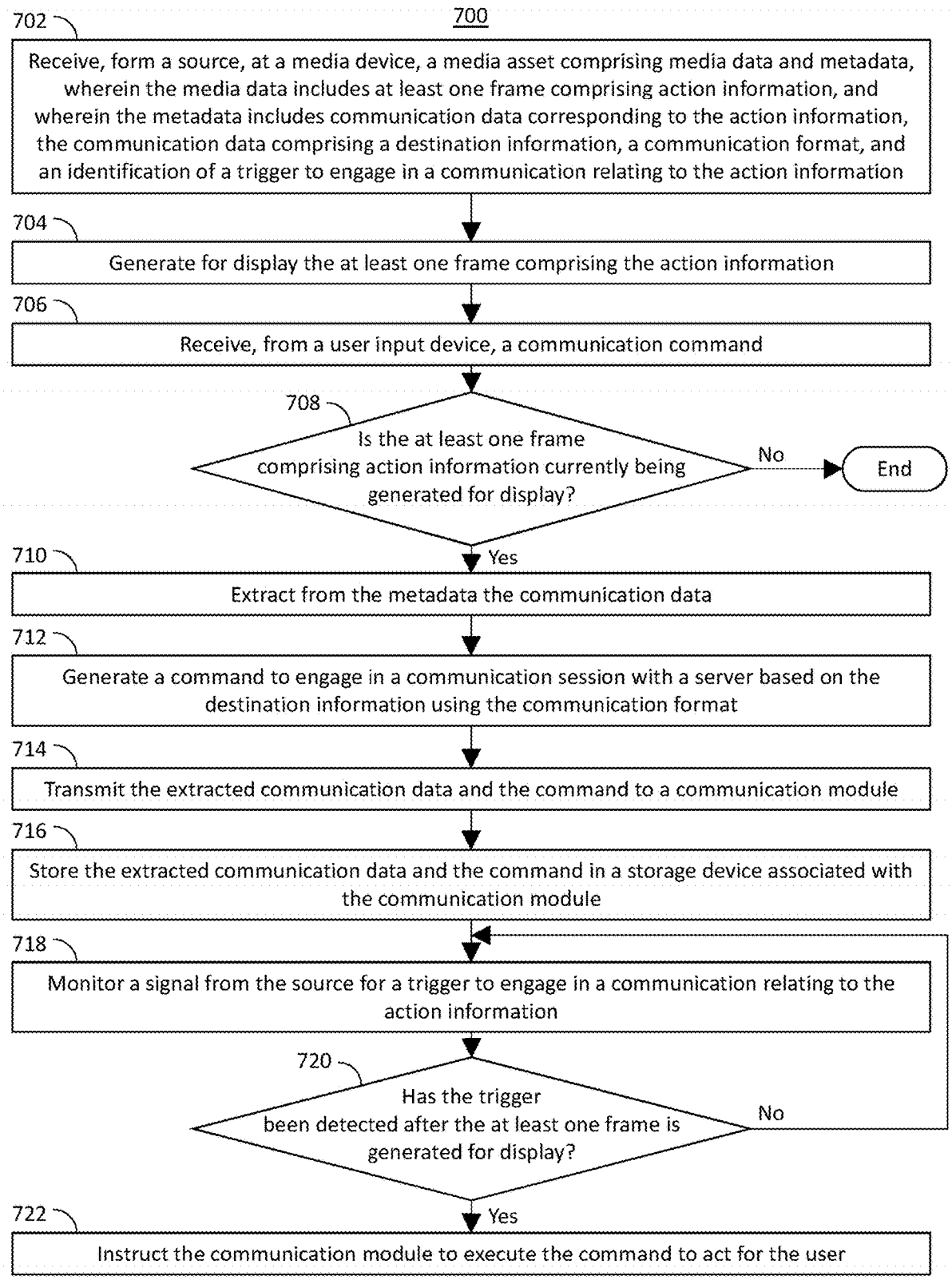
FIG. 7 is a flowchart representing a process for scheduling a communication session according to an embodiment of the disclosure.

FIG. 7 is a flowchart representing an illustrative process for scheduling a communication session in accordance with some embodiments of the disclosure. The flowchart in FIG. 7 represents a process 700 implemented on control circuitry 404 for scheduling a communication session according to an embodiment of the disclosure. It should be noted that process 700 or any action thereof could be performed on, or provided by, any of the devices shown in FIGS. 4-5. For example, process 700 may be executed by control circuitry 404 (FIG. 4) as instructed by a media guidance application implemented on a user device (e.g., user equipment devices 502, 504, and/or 506 (FIG. 5), as well as display screen 100 (FIG. 1)) in order to schedule a communication session. In addition, one or more actions of process 700 may be incorporated into or combined with one or more actions of any other process or embodiment described herein.

At 702, control circuitry 404 may receive a media asset from a media content source, such as media content source 516. The media asset may include both media data and metadata. The media data may comprise video and audio data used by control circuitry to generate video frames for display using, for example, display 412, and sounds for output using, for example, speakers 414. The media data may include data for at least one video frame comprising action information. For example, the video frame may include a representation of a phone number and instructions to a user to call the phone number at a specific time to cast a vote. Additionally, the metadata may include communication data corresponding to the action information. For example, the metadata may include data fields such as "Communication Destination" and "Communication Format" indicating to where and how communications should be directed so as to cast a vote. The metadata may further include an identification of a trigger to engage in communication relating to the action information. For example, the metadata may include a data field identifying a specific waveform or digital signal for which control circuitry 404 should monitor. Alternatively, the metadata may include an identifier of another metadata field whose value is to be monitored for a change, such as from 0 to 1, or from FALSE to TRUE.

At 704, control circuitry 404 may generate for display the at least one frame comprising the action information. For example, control circuitry 404 may process the media asset for output and generate video signals to output using, for example, display 412, and sounds to output using, for example, speakers 414. In the course of generating each sequential frame of the media asset for output, control circuitry 404 may generate for display a video signal corresponding to the frame of the media asset containing the action information. Control circuitry 404 may identify the frame as containing the action information in a number of ways. For example, control circuitry 404 may capture the frame as a still image, and process the frame to identify a banner across a portion of the screen. Typically, such banners are located in a lower portion of the screen, and are rectangular in shape. Control circuitry 404 may use such parameters to locate the banner. Alternatively, if the media asset typically displays action information in a particular position or with particular dimensions, control circuitry 404 may retrieve such information from a source, and use parameters defined therein to locate the action information. Control circuitry 404 may alternatively identify the frame containing the action information by determining if the metadata associated with the frame contains communication data corresponding to action information.

At 706, control circuitry 404 may receive, from a user input device, a communication command. For example, a user may press a "vote" button on a user input device, or issue a voice command such as a vocal utterance of the word "vote." The user input device may be a remote control, smartphone, tablet, microphone, or other user input device, and control circuitry 404 may include or be communicatively coupled with a receiver module, such as user input interface 410, configured to receive signals from the user input device. The user input device may transmit signals via infrared, WiFi, Bluetooth®, or any other suitable signaling protocol. Upon receipt of the signal, control circuitry 404 may process the signal and determine what button was pressed, or what voice command was issued. For example, control circuitry 404 may compare the received signal to a database of user input signals to determine what button on the user input device was pressed, or what voice command was issued.

At 708, control circuitry 404 may determine whether a frame including action information is currently being generated for display. For example, using the same methods described above, control circuitry 404 may identify a banner in the frame currently being displayed. Alternatively, upon first displaying a frame containing action information, control circuitry 404 may initialize a variable representing whether or not a frame including action information is being generated for display. The variable may be an integer or Boolean value. For example, control circuitry 404 may assign a value of 1 or TRUE to the variable when a frame containing action information is being generated for display, and a value of 0 or FALSE when the frame being generated for display does not include action information.

Control circuitry 404 may also store a variable representing whether action information is currently available. For example, during a talent competition program, the media asset may include frame containing action information for a contestant for the first thirty seconds of that contestant's performance, while the performance of that contestant may continue for several minutes. A user may decide to vote for the contestant only after viewing a certain portion or percentage of the performance, which may occur after the action information has been displayed. Therefore, control circuitry 404 may store an indication of the availability of the action information until, for example, the end of the performance.

At 710, control circuitry 404 may extract communication data from the metadata associated with the frame containing action information. For example, control circuitry 404 may access the metadata of the frame and copy the communication data to a memory location in a memory storage device, such as storage 408. The communication data may include destination information and a communication format. The destination information may be a phone number, SMS short code, MMS short code, email address, URL, or any other suitable communication destination identifier. The communication format may indicate the type of communication to be used, such as telephony, SMS, MMS, email, or Internet protocols, and may inform control circuitry 404 or communication module 416 of the type of communication interface required for the communication.

At 712, control circuitry 404 may generate a command to engage in a communication session with a server based on the destination information and using the communication format. For example, control circuitry 404 may generate a command in a format understood by communication module 416. For example, control circuitry 404 may generate the command "OPEN [d] USING [f]" where "[d]" represents the destination information, and "[f]" represents the communication format. For example, if the destination information is the phone number 1-800-VOTE-4-ME, as shown in action information banner 102 of FIG. 1, and the communication format is telephony, then the command generated by control circuitry 404 may be "OPEN 18008683463 USING tel." Control circuitry 404 may convert letters present in a phone number to their corresponding digits. The command may optionally also include a content field where the communication format is a text-based format. If the destination information is the short code 55222, as shown in action information banner 122 of FIG. 1, and the communication format is SMS, then the command generated by control circuitry 404 may be "OPEN 55222 USING sms CONTENT 'Vote'," where the action information includes instructions to send the word "vote" to the indicated short code destination.

At 714, control circuitry 404 may transmit the extracted communication data and the command to communication module 416. For example, control circuitry 404 may copy the command from active memory (e.g., RAM) where it may be temporarily stored upon creation, and may copy the communication data from a memory storage device such as storage 308. The copied communication data and command may then be transferred by control circuitry 404 to communication module 416 via a communication path through which control circuitry 404 and communication module 416 are coupled.

At 716, communication module 416 may store the communication data and the command in a storage device associated with communication module 416. For example, communication module 416 may include a memory storage device separate from storage 408 which may act as a buffer for pending communication commands.

At 718, control circuitry 404 may monitor a signal from the source, such as media content source 516 or media guidance data source 518, for a trigger to engage in communication relating to the action information. As described above, an identification of the trigger may be part of the communication data received by control circuitry 404. Control circuitry 404 may include a suitable signal processing module to correlating analog waveforms with known signals to determine if the trigger has been received. Alternatively, control circuitry 404 may periodically access metadata relating to the media asset to determine if a particular value is included in a particular metadata field. For example, control circuitry 404 may access the metadata using a PSIP decoding module and search for specific metadata fields contained within the media asset.

At 720, control circuitry 404 determines whether the trigger has been detected. To prevent control circuitry 404 from instructing communication module 416 to engage in communications before communication data has been received, control circuitry 404 also determines if the frame containing voting information has yet been generated for display. For example, control circuitry 404 may determine if communication data has been extracted by accessing a memory location in a storage device such as storage 408 at which communication data is customarily stored. Alternatively, control circuitry 404 may maintain a variable indicating whether communication data has been received, and may poll the value of the variable to determine if communication data has yet been received. Control circuitry 404 continues to monitor the signal for the trigger until the trigger is detected.

If the trigger is detected, then, at 722, control circuitry 404 instructs communication module 416 to execute the command and act for the user. For example, if communication module 416 is integrated with control circuitry 404, control circuitry 404 may send an electrical signal, pulse, or other electronic communication to communication module 416 as an instruction to execute the command. If communication module 416 is a stand-alone device, control circuitry 404 may transmit a signal to communication module 416 using radio, WiFi, Bluetooth®, infrared, or any other suitable communication method.

It is contemplated that the actions or descriptions of FIG. 7 may be used with any other embodiment of this disclosure. In addition, the actions and descriptions described in relation to FIG. 7 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 7.

Figure 8:
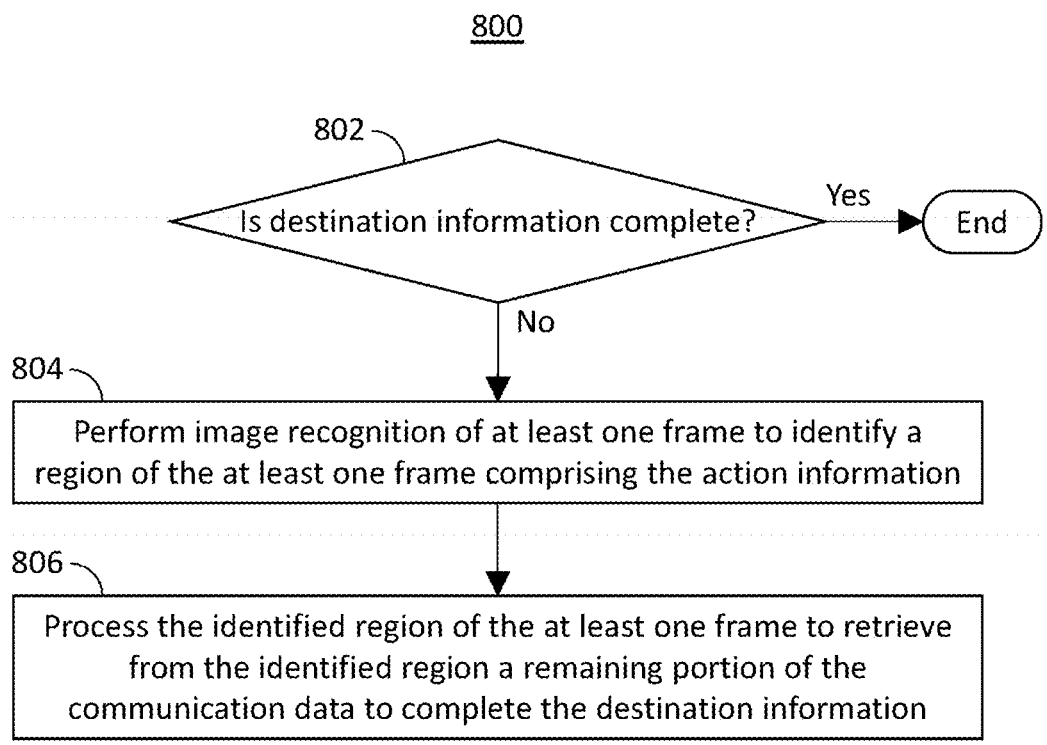
FIG. 8 is a flowchart representing a process for completing communication data by processing a region of a frame comprising action information according to an embodiment of the disclosure.

FIG. 8 is a flowchart representing an illustrative process for completing communication data by processing a region of a frame comprising action information in accordance with some embodiments of the disclosure. The flowchart in FIG. 8 represents a process 800 implemented on control circuitry 404 for completing communication data by processing a region of a frame comprising action information according to an embodiment of the disclosure. It should be noted that process 800 or any action thereof could be performed on, or provided by, any of the devices shown in FIGS. 4-5. For example, process 800 may be executed by control circuitry 404 (FIG. 4) as instructed by a media guidance application implemented on a user device (e.g., user equipment devices 502, 504, and/or 506 (FIG. 5), as well as display screen 100) in order to complete communication data by processing a region of a frame comprising action information. In addition, one or more actions of process 800 may be incorporated into or combined with one or more actions of any other process or embodiment described herein.

At 802, control circuitry 404 may determine if the destination information is complete. For example, control circuitry 404 may compare the destination information to a known character pattern based on the communication format using regular expressions. For example, the communication format may be telephony. Control circuitry 404 may compare the destination information to the character pattern "###-###-####" to determine if the destination information is complete.

If the destination information is determined to be incomplete then, at 804, control circuitry 404 may perform image recognition on the frame to identify a region of the frame comprising action information. Control circuitry 404 may identify a region on the frame in which the action information is displayed. Control circuitry 404 may include a video processing module or image processing module, implemented in software, hardware, or firmware, that can identify elements in a video frame or in a still image capture of a video frame. Control circuitry 404 may be provided with parameters by which to identify the action information banner 102, 122, 142, 162, 182, such as position, size, and appearance parameters. Control circuitry 404 may receive the parameters in metadata associated with the media asset, or the parameters may be included in electronic program guide data. Alternatively, control circuitry 404 may be configured to learn the parameters while the media asset is being displayed. Control circuitry 404 may process the media asset to track the appearance, disappearance, and movement of various elements in the media asset, and be configured to identify an overlay of a particular size, shape, and location, and containing text, as an action information banner.

At 806, control circuitry 404 may process the identified region of the frame to retrieve a remaining portion of the communication data to complete the destination information. For example, control circuitry 404 may use character recognition to extract the complete phone number from action information banner 102.

It is contemplated that the actions or descriptions of FIG. 8 may be used with any other embodiment of this disclosure. In addition, the actions and descriptions described in relation to FIG. 8 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 8.

Figure 9:
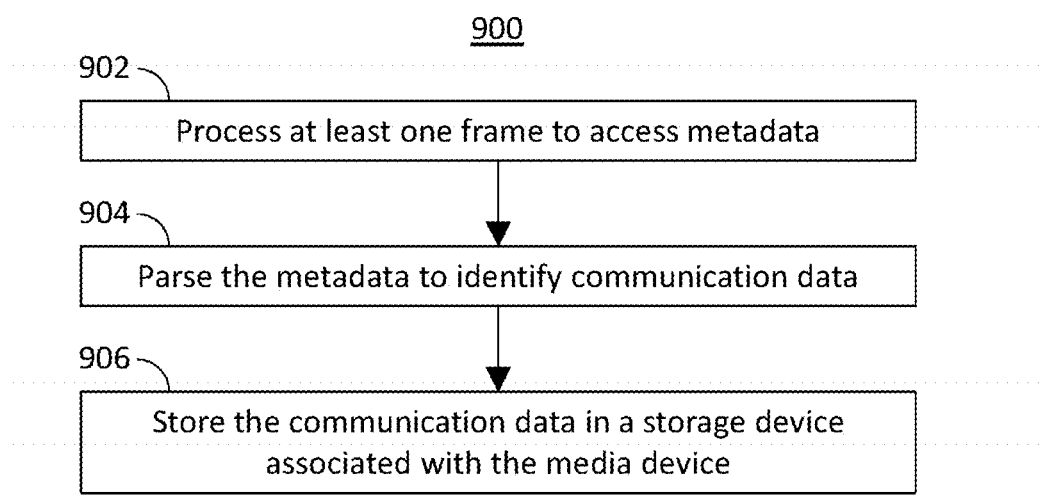
FIG. 9 is a flowchart representing a process for extracting communication data from metadata according to an embodiment of the disclosure.

FIG. 9 is a flowchart representing an illustrative process for extracting communication data from metadata in accordance with some embodiments of the disclosure. The flowchart in FIG. 9 represents a process 900 implemented on control circuitry 404 for extracting communication data from metadata according to an embodiment of the disclosure. It should be noted that process 900 or any action thereof could be performed on, or provided by, any of the devices shown in FIGS. 4-5. For example, process 900 may be executed by control circuitry 404 (FIG. 4) as instructed by a media guidance application implemented on a user device (e.g., user equipment devices 502, 504, and/or 506 (FIG. 5), as well as display screen 100 (FIG. 1)) in order to extract communication data from metadata. In addition, one or more actions of process 900 may be incorporated into or combined with one or more actions of any other process or embodiment described herein.

At 902, control circuitry 404 may process the frame comprising action information to access metadata of the frame. For example, control circuitry 404 may decode metadata from packets in an MPEG-2 transport stream, such as PSIP metadata. Control circuitry 404 may be configured to identify portions of media packets by the type of data they contain.

At 904, control circuitry 404 may parse the metadata to identify the communication data. For example, control circuitry 404 may search the metadata for specific entries, tables, or fields. For example, the metadata may contain a communication table, which in turn contains fields for the destination information, communication format, and trigger identification.

Once control circuitry 404 has identified the communication data, control circuitry 404 may, at 906, store the communication data in a storage device associated with the control circuitry, such as storage 408. Control circuitry 404 may initialize a table, list, database, or other data structure and copy the communication data from the metadata to the data structure.

It is contemplated that the actions or descriptions of FIG. 9 may be used with any other embodiment of this disclosure. In addition, the actions and descriptions described in relation to FIG. 9 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 9.

Figure 10:
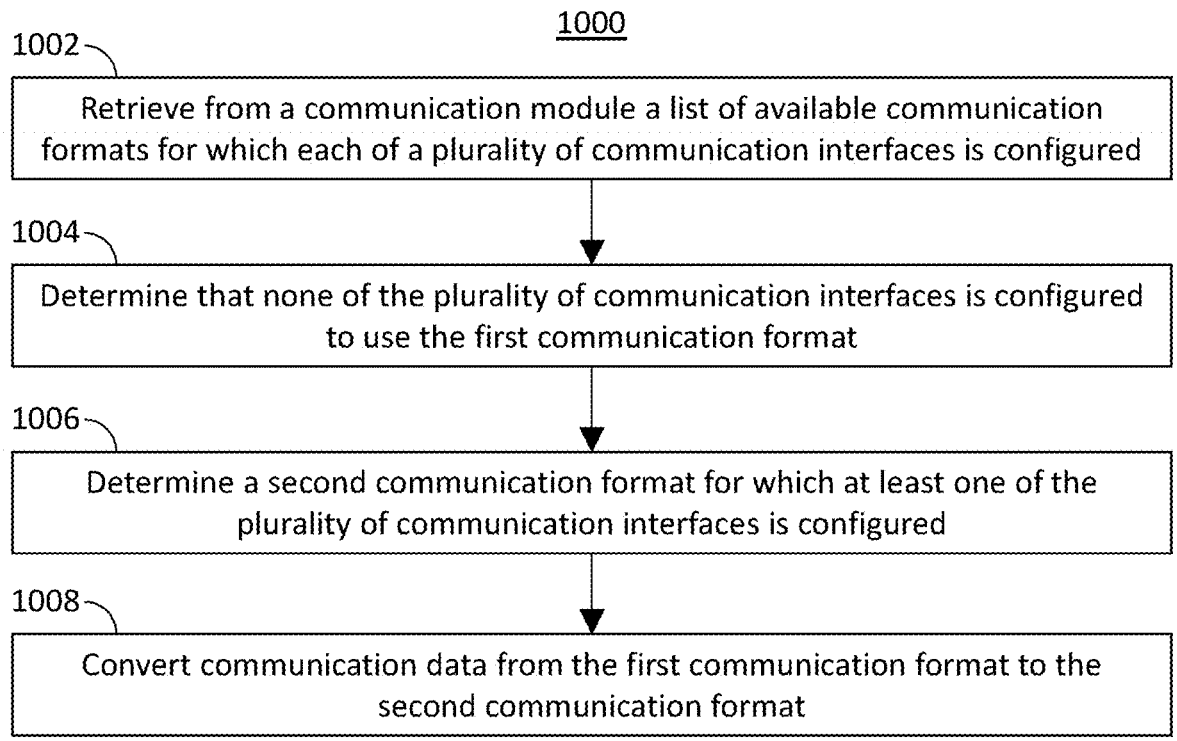
FIG. 10 is a flowchart representing a process for converting communication data from a first communication format to a second communication format according to an embodiment of the disclosure.

FIG. 10 is a flowchart representing an illustrative process for converting communication data from a first communication format to a second communication format in accordance with some embodiments of the disclosure. The flowchart in FIG. 10 represents a process 1000 implemented on control circuitry 404 for converting communication data from a first communication format to a second communication format according to an embodiment of the disclosure. It should be noted that process 1000 or any action thereof could be performed on, or provided by, any of the devices shown in FIGS. 4-5. For example, process 1000 may be executed by control circuitry 404 (FIG. 4) as instructed by a media guidance application implemented on a user device (e.g., user equipment devices 502, 504, and/or 506 (FIG. 5), as well as display screen 100 (FIG. 1)) in order to convert communication data from a first communication format to a second communication format. In addition, one or more actions of process 1000 may be incorporated into or combined with one or more actions of any other process or embodiment described herein.

Communication module 416 may include a plurality of communication interfaces. Each communication interface may be configured to use a different communication format. It is possible that the communication format specified in the communication data is not one of the formats for which any interface of the communication module 416 is configured. Thus, at 1002, control circuitry 404 may retrieve from communication module 416 a list of available communication formats for which the plurality of interfaces is configured. For example, control circuitry 404 may send a signal to communication module 416 requesting a list of available communication formats. Upon receiving the request, communication module 416 may access a manifest or configuration file which may include a listing of each communication interface and the format for which it is configured. Alternatively, communication module 416 may poll each communication interface to determine the format for which each interface is configured, and compile the results into a single list, table, or database. Communication module 416 may send the list of formats to control circuitry 404 as a response to the request.

At 1004, control circuitry 404 may determine that none of the plurality of communication interfaces is configured to use the communication format specified in the communication data. For example, control circuitry 404 may compare the specified communication format with the list of communication formats retrieved from communication module 416. The communication data may specify telephony as the communication format, while none of the communication interfaces is configured for making phone calls.

At 1006, control circuitry 404 may determine an alternative communication format for which at least one of the communication interfaces is configured. Control circuitry 404 may be provided with a database or other data structure which lists each communication format and possible alternative formats. For example, VOIP may be an alternative to telephony, and MMS may be an alternative to SMS. Control circuitry 404 may search this database or data structure for an entry relating to the specified communication format, and compare the alternate communication formats listed in the database or data structure with the list of available formats for which the communication interfaces are configured. If there are no alternate formats, or if there are no communication interfaces configured for any of the alternate formats, control circuitry 404 may generate for display a message overlaid on the media asset to inform the user that the vote cannot be cast.

At 1008, control circuitry 404 may convert the communication data from the communication format specified in the communication data to the alternate format. For example, control circuitry 404 may convert a telephone number to a VOIP format, such as an SIP INVITE request, when telephony is not a format for which any communication interface is configured.

It is contemplated that the actions or descriptions of FIG. 10 may be used with any other embodiment of this disclosure. In addition, the actions and descriptions described in relation to FIG. 10 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 10.

Figure 11:
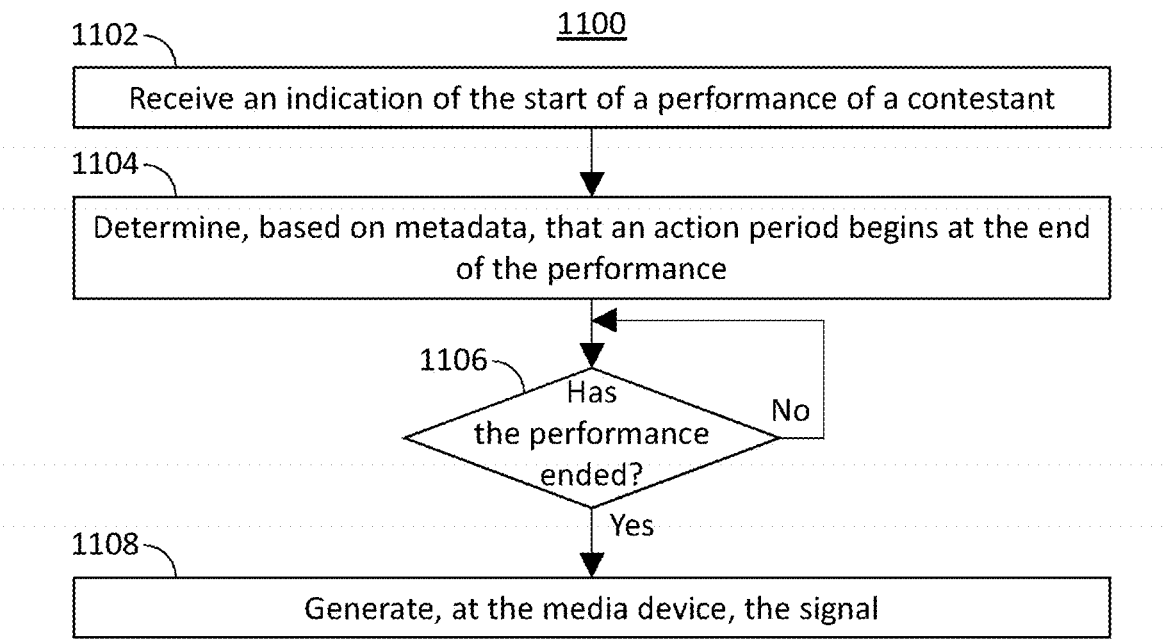
FIG. 11 is a flowchart representing a process for generating a signal at a media device at the end of a performance according to an embodiment of the disclosure.

FIG. 11 is a flowchart representing an illustrative process for generating a signal at a media device at the end of a performance in accordance with some embodiments of the disclosure. The flowchart in FIG. 11 represents a process 1100 implemented on control circuitry 404 for generating a signal at a media device at the end of a performance according to an embodiment of the disclosure. It should be noted that process 1100 or any action thereof could be performed on, or provided by, any of the devices shown in FIGS. 4-5. For example, process 1100 may be executed by control circuitry 404 (FIG. 4) as instructed by a media guidance application implemented on a user device (e.g., user equipment devices 502, 504, and/or 506 (FIG. 5), as well as display screen 100 (FIG. 1)) in order to generate a signal at a media device at the end of a performance. In addition, one or more actions of process 1100 may be incorporated into or combined with one or more actions of any other process or embodiment described herein.

In some embodiments, the media asset may be a talent competition program. During the talent competition program, several contestants may perform. A contestant may be identified in the communication data as the trigger. At 1102, control circuitry 404 may receive an indication of the start of a performance of the contestant. For example, control circuitry 404 may receive metadata indicating that the performance of a contestant has begun.

At 1104, control circuitry 404 may determine, based on metadata, that an action period begins at the end of the performance. For example, the metadata may specify that voting begins at approximately two minutes after the start of the performance. Additional metadata relating to the media asset may indicate that all performances may not exceed two minutes in length. Using these metadata, control circuitry 404 may conclude that voting begins at the end of the performance.

At 1106, control circuitry 404 may determine whether the performance has ended. For example, control circuitry 404 may determine that a performance has ended based on receipt of a second indication of the start of a performance of another contestant.

If the performance has ended, then, at 1108, control circuitry 404 may generate the trigger signal, in response to which the communication module 416 is instructed to execute the command to engage in communications using the communication data.

It is contemplated that the actions or descriptions of FIG. 11 may be used with any other embodiment of this disclosure. In addition, the actions and descriptions described in relation to FIG. 11 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 11.

Figure 12:
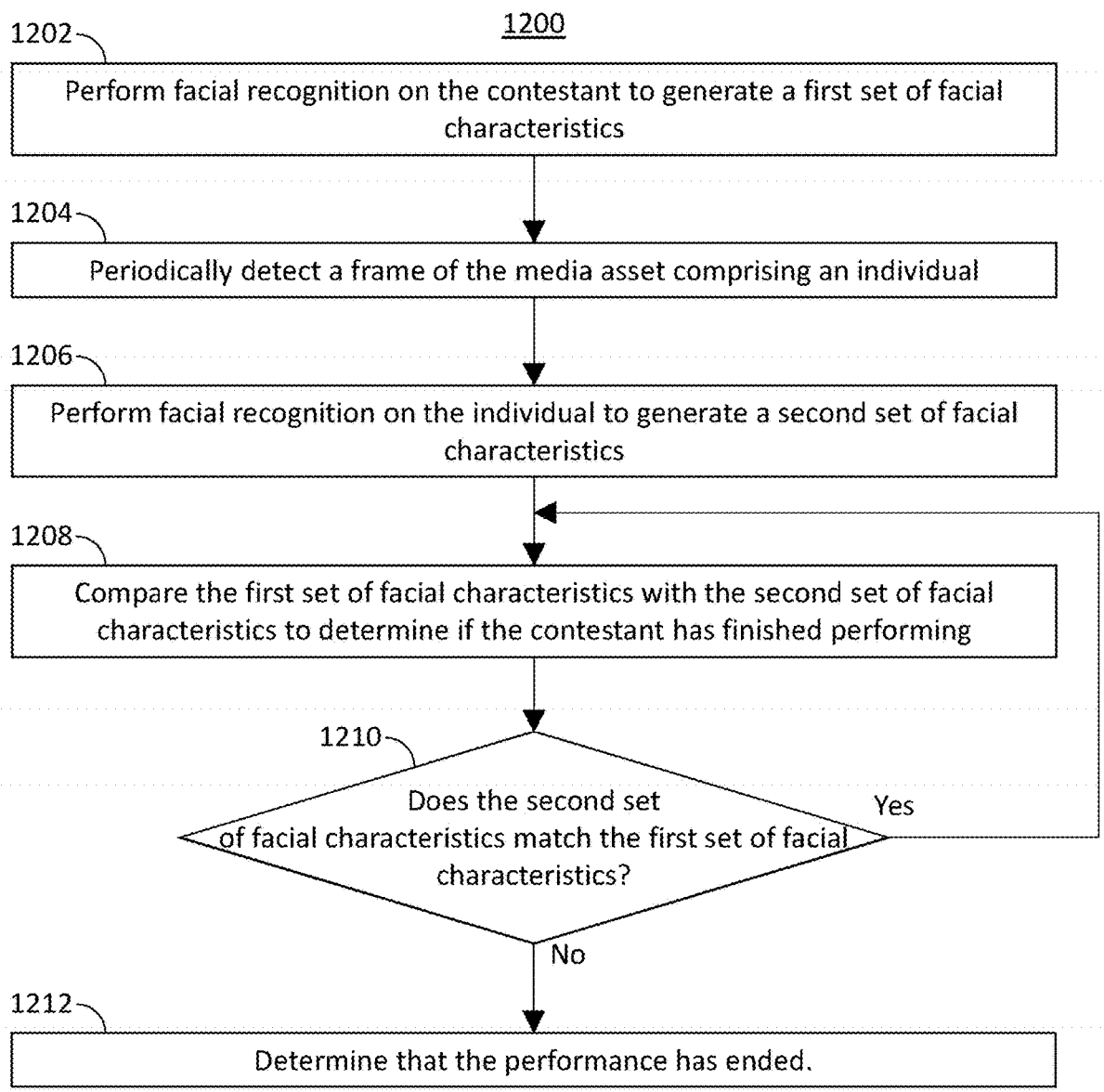
FIG. 12 is a flowchart representing a process for determining if a performance has ended according to an embodiment of the disclosure.

FIG. 12 is a flowchart representing an illustrative process for determining if a performance has ended in accordance with some embodiments of the disclosure. The flowchart in FIG. 12 represents a process 1200 implemented on control circuitry 404 for determining if a performance has ended according to an embodiment of the disclosure. It should be noted that process 1200 or any action thereof could be performed on, or provided by, any of the devices shown in FIGS. 4-5. For example, process 1200 may be executed by control circuitry 404 (FIG. 4) as instructed by a media guidance application implemented on a user device (e.g., user equipment devices 502, 504, and/or 506 (FIG. 5), as well as display screen 100 (FIG. 1)) in order to determine if a performance has ended. In addition, one or more actions of process 1200 may be incorporated into or combined with one or more actions of any other process or embodiment described herein.

In some embodiments, in order to determine if the performance has ended, control circuitry 404 may, at 1202, perform facial recognition on the contestant to generate a first set of facial characteristics. Control circuitry 404 may be configured to capture a frame of the performance as a still image and process the image using facial recognition to identify the characteristics of the face of the contestant. Control circuitry 404 may process several frames of the performance to compile facial characteristics of the contestant from multiple angles. The facial characteristics may be stored in a memory storage device, such as storage 308.

At 1204, control circuitry 404 may periodically detect a frame of the media asset comprising an individual. For example, control circuitry 404 may periodically process a frame to determine if an individual is being displayed prominently in the frame, such as when the contestant is performing. Control circuitry 404 may use factors such as the position and apparent size, proximity, or other video characteristics indicating that the individual is being featured in the frame.

At 1206, control circuitry 404 may perform facial recognition on the individual to generate a second set of facial characteristics. Control circuitry 404 may process the individual using facial recognition in a similar way as above to generate facial characteristics of the individual in the frame.

At 1208, control circuitry 404 may compare the first set of facial characteristics with the second set of facial characteristics to determine if the contestant has finished performing. For example, control circuitry 404 may compare the facial characteristics of the contestant established at the start of the performance with the characteristics of the individual displayed in the frame.

At 1210, control circuitry 404 may determine if the second set of facial characteristics matches the first set of facial characteristics. For example control circuitry 404 may compare each characteristic in the second set of facial characteristics with the corresponding characteristic of the first set of facial characteristics. If the characteristic of the second set of facial characteristics is an exact match, or within a certain threshold of the corresponding characteristic of the first set of facial characteristics, control circuitry 404 may flag the characteristic as a match. After making similar comparisons for each and every characteristic, control circuitry 404 may determine whether the second set of facial characteristics matches the first set of facial characteristics by calculating the percentage of compared characteristics flagged as a match. If the percentage is within a certain threshold, control circuitry 404 may determine that the second set of facial characteristics matched the first set of facial characteristics. If the percentage is below the threshold, control circuitry 404 may determine that the second set of facial characteristics does not match the first set of facial characteristics.

In response to determining that the second set of facial characteristics does not match the first set of facial characteristics, control circuitry 404 may, at 1212, determine that the performance has ended. For example, if control circuitry 404 determines that an individual being featured in the media asset is currently a different individual (i.e., an individual with different facial characteristics than the contestant), the performance may have ended.

It is contemplated that the actions or descriptions of FIG. 12 may be used with any other embodiment of this disclosure. In addition, the actions and descriptions described in relation to FIG. 12 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 12.

Figure 13:
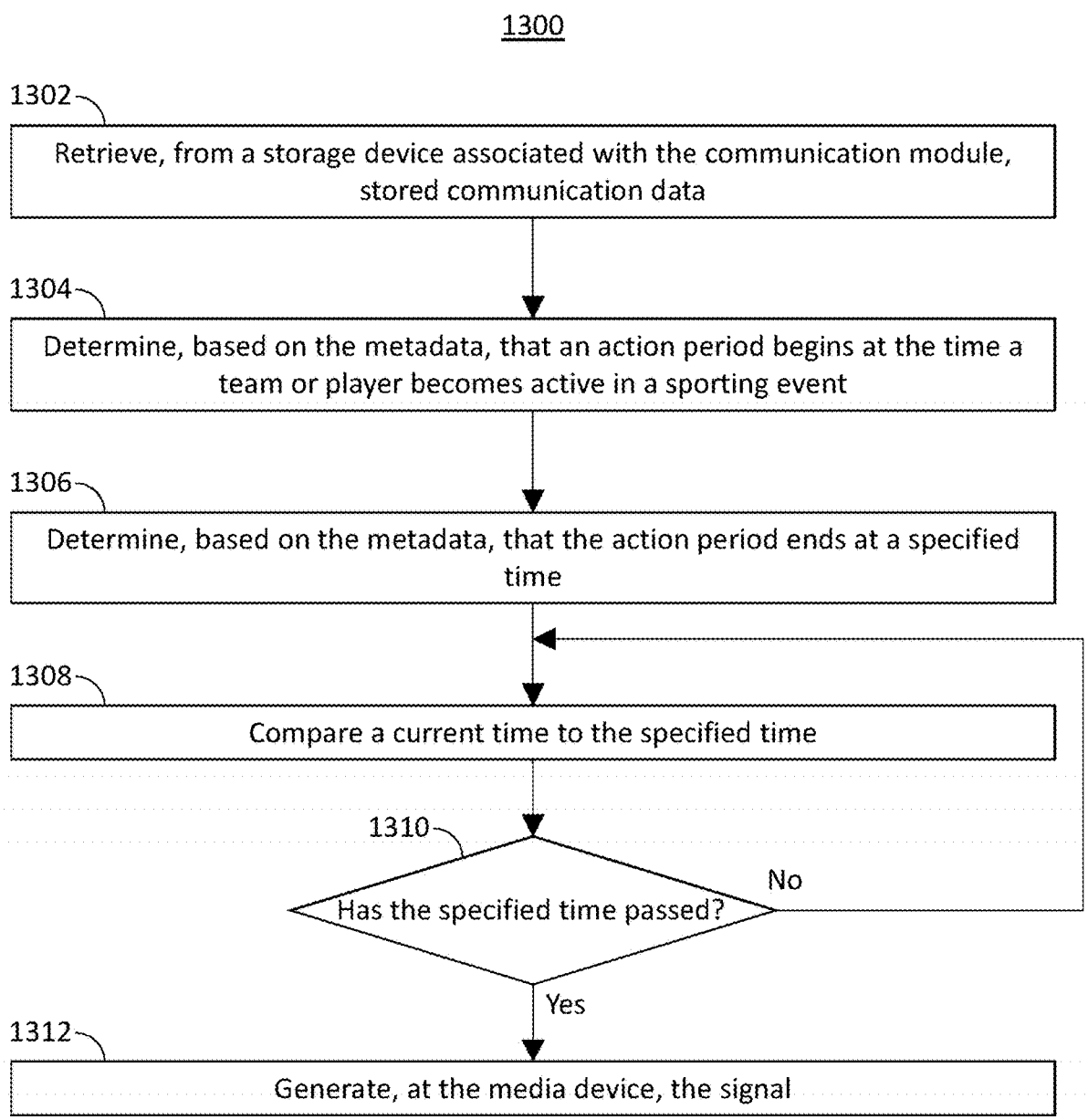
FIG. 13 is a flowchart representing a process for generating a signal at a media device at a specified time according to an embodiment of the disclosure.

FIG. 13 is a flowchart representing an illustrative process for generating a signal at a media device at a specified time in accordance with some embodiments of the disclosure. The flowchart in FIG. 13 represents a process 1300 implemented on control circuitry 404 for generating a signal at a media device at a specified time according to an embodiment of the disclosure. It should be noted that process 1300 or any action thereof could be performed on, or provided by, any of the devices shown in FIGS. 4-5. For example, process 1300 may be executed by control circuitry 404 (FIG. 4) as instructed by a media guidance application implemented on a user device (e.g., user equipment devices 502, 504, and/or 506 (FIG. 5), as well as display screen 100 (FIG. 1)) in order to generate a signal at a media device at a specified time. In addition, one or more actions of process 1300 may be incorporated into or combined with one or more actions of any other process or embodiment described herein.

In some embodiments, the media asset may be a sporting event. A particular team or player may be identified as the trigger. At 1302, control circuitry 404 may receive an indication of the team or player becoming active in the sporting event. For example, control circuitry 404 may receive an indication, for example through metadata, at the start of an inning, that the New York Yankees are now the batting team in a baseball game, and the Boston Red Sox are now the fielding team. Control circuitry may also receive an indication of a particular player coming up to bat, such as Yankees outfielder Aaron Hicks.

At 1304, control circuitry 404 may determine, based on the metadata, that an action period begins at the time the team or player becomes active in the sporting event. For example, the communication data may include timing information related to the voting information.

At 1306, control circuitry 404 may determine that the action period ends at a specified time. For example, the metadata may include a field indicating that votes for the outcome of the current player's actions are accepted only between the time the player comes up to bat, and the time the first pitch is thrown to that player. Control circuitry 404 may receive metadata indicating the temporal boundaries of the action period.

At 1308, control circuitry 404 may compare a current time to the specified time. For example, control circuitry 404 may access the current time from a system clock or a control signal from for example, media guidance data source 518, and compare it to the specified time.

At 1310, control circuitry 404 may determine if the specified time has passed. If the specified time has not yet passed, control circuitry continues to monitor the current time until the specified time arrives.

At 1312, in response to determining that the specified time has passed, control circuitry 404 may generate, at the media device, the signal. For example, after receiving an indication of the end of the action period, control circuitry 404 may generate the identified trigger signal.

It is contemplated that the actions or descriptions of FIG. 13 may be used with any other embodiment of this disclosure. In addition, the actions and descriptions described in relation to FIG. 13 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 13.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for scheduling a communication session, comprising:
  receiving, from a source, at a media device, a media asset comprising media data, metadata, and a video of a performance, wherein:
    the media data includes at least one frame comprising action information that includes destination information and a communication format;
    the metadata includes communication data corresponding to the action information; and
    the communication data comprises the destination information, the communication format, and an identification of a trigger to engage in a communication relating to the action information;
  determining that the performance has ended, comprising:
    identifying a face of a performer in a frame of the media asset;
    performing facial recognition on the frame containing the face of the performer to generate a first set of facial characteristics;
    periodically detecting whether a subsequent frame of the media asset comprises a face;
    performing facial recognition on the face to generate a second set of facial characteristics;
    comparing the first set of facial characteristics with the second set of facial characteristics; and
    based at least in part on determining that the second set of facial characteristics does not match the first set of facial characteristics, determining that the performance has ended;
  based at least in part on the determining that the performance has ended, generating, at the media device, a signal;
  generating for display the at least one frame comprising the action information;
  receiving, from a user input device, a communication command for acting on the action information while the at least one frame is being generated for display; and
  based at least in part on the receiving the communication command:
    determining that the at least one frame comprising action information is currently being generated for display;
    extracting from the metadata the communication data;
    generating a command to engage in a communication session with a server based on the destination information using the communication format;
    transmitting the extracted communication data and the command to a communication module;
    storing the extracted communication data and the command in a storage device associated with the communication module;
    monitoring the signal for the trigger to engage in the communication relating to the action information; and based at least in part on detecting the trigger after the at least one frame is generated for display, instructing the communication module to execute the command to act on the action information.

2. The method of claim 1, further comprising:
determining that the destination information in the communication data is incomplete;
performing image recognition on the at least one frame to identify a region of the at least one frame comprising the action information; and
processing the identified region of the at least one frame to retrieve from the identified region a remaining portion of the communication data to complete the destination information.

3. The method of claim 1, wherein extracting from the metadata the communication data comprises:
processing the at least one frame to access the metadata;
parsing the metadata to identify the communication data; and
storing the communication data in a storage device associated with the media device.

4. The method of claim 1, wherein:
the communication module comprises a plurality of communication interfaces, each communication interface of the plurality of communication interfaces being configured to use a different communication format;
the communication format is a first communication format; and
generating the command to engage in the communication session with the server based on the extracted communication data comprises:
retrieving from the communication module a list of available communication formats for which each of the plurality of communication interfaces is configured;
determining that none of the plurality of communication interfaces is configured to use the first communication format;
determining a second communication format for which at least one of the plurality of communication interfaces is configured; and
converting the communication data from the first communication format to the second communication format.

5. The method of claim 1, wherein:
the signal is received from the source from one of an out-of-band channel, data sent in a vertical blanking interval, and the metadata; and
monitoring the signal for the trigger to engage in the communication relating to the action information comprises periodically comparing the signal from the source with the identification of the trigger to engage in a communication relating to the action information.

6. The method of claim 1, wherein the performance comprises a talent competition program and the performer is a contestant, and wherein the identification of the trigger comprises the contestant associated with the action information, further comprising:
receiving an indication of the start of a performance of the contestant; and
determining, based on the metadata, that an action period begins at the end of the performance.

7. The method of claim 6, wherein determining that the performance has ended comprises receiving a second indication of the start of a performance of a second contestant.

8. The method of claim 1, wherein the communication module executes the command to act on the action information by:
retrieving, from the storage device associated with the communication module, the stored communication data;
extracting, from the stored communication data, the destination information and the communication format;
accessing a communication interface of the communication module, the communication interface being configured to use the communication format;
inputting the destination information to the communication interface; and
initiating at the communication interface a communication session to a server associated with the destination information.

9. The method of claim 1, wherein the performance comprises a sporting event and the performer is one of a team or a player, and wherein the identification of the trigger comprises one of a team or a player associated with the action information, further comprising:
receiving an indication of the team or player becoming active in the sporting event;
determining, based on the metadata, that an action period begins at the time the team or player becomes active in the sporting event;
determining, based on the metadata, that the action period ends at a specified time;
comparing a current time to the specified time to determine if the specified time has passed; and
based at least in part on determining that the specified time has passed, generating, at the media device, the signal.

10. A system for scheduling a communication session, comprising:
a media device;
a user input device; and
control circuitry configured to:
receive, from a source, at the media device, a media asset comprising media data, metadata, and a video of a performance, wherein:
the media data includes at least one frame comprising action information that includes destination information and a communication format;
the metadata includes communication data corresponding to the action information; and
the communication data comprises the destination information, the communication format, and an identification of a trigger to engage in a communication relating to the action information;
determine that the performance has ended, comprising:
identifying a face of a performer in a frame of the media asset;
performing facial recognition on the frame containing the face of the performer to generate a first set of facial characteristics;
periodically detecting whether a subsequent frame of the media asset comprises a face;
performing facial recognition on the face to generate a second set of facial characteristics;
comparing the first set of facial characteristics with the second set of facial characteristics; and
based at least in part on determining that the second set of facial characteristics does not match the first set of facial characteristics, determining that the performance has ended;

based at least in part on the determining that the performance has ended, generate, at the media device, a signal;
generate for display the at least one frame comprising the action information;
receive, from the user input device, a communication command for acting on the action information while the at least one frame is being generated for display; and
based at least in part on receiving the communication command:
 determine that the at least one frame comprising action information is currently being generated for display;
 extract from the metadata the communication data;
 generate a command to engage in a communication session with a server based on the destination information using the communication format;
 transmit the extracted communication data and the command to a communication module;
 store the extracted communication data and the command in a storage device associated with the communication module;
 monitor the signal for the trigger to engage in the communication relating to the action information; and
 based at least in part on detecting the trigger after the at least one frame is generated for display, instruct the communication module to execute the command to act on the action information.

11. The system of claim 10, wherein the control circuitry is further configured to:
determine that the destination information in the communication data is incomplete;
perform image recognition on the at least one frame to identify a region of the at least one frame comprising the action information; and
process the identified region of the at least one frame to retrieve from the identified region a remaining portion of the communication data to complete the destination information.

12. The system of claim 10, wherein the control circuitry configured to extract from the metadata the communication data is further configured to:
process the at least one frame to access the metadata;
parse the metadata to identify the communication data; and
store the communication data in a storage device associated with the media device.

13. The system of claim 10, wherein:
the communication module comprises a plurality of communication interfaces, each communication interface of the plurality of communication interfaces being configured to use a different communication format;
the communication format is a first communication format; and
the control circuitry configured to generate the command to engage in the communication session with the server based on the extracted communication data is further configured to:
retrieve from the communication module a list of available communication formats for which each of the plurality of communication interfaces is configured;
determine that none of the plurality of communication interfaces is configured to use the first communication format;
determine a second communication format for which at least one of the plurality of communication interfaces is configured; and
convert the communication data from the first communication format to the second communication format.

14. The system of claim 10, wherein:
the signal is received from the source from one of an out-of-band channel, data sent in a vertical blanking interval, and the metadata; and
the control circuitry configured to monitor the signal for the trigger to engage in the communication relating to the action information is further configured to periodically compare the signal from the source with the identification of the trigger to engage in a communication relating to the action information.

15. The system of claim 10, wherein the performance comprises a talent competition program and the performer is a contestant, wherein the identification of the trigger comprises the contestant associated with the action information, and wherein the control circuitry is further configured to:
receive an indication of the start of a performance of the contestant; and
determine, based on the metadata, that an action period begins at the end of the performance.

16. The system of claim 15, wherein the control circuitry configured to determine that the performance has ended is further configured to receive a second indication of the start of a performance of a second contestant.

17. The system of claim 10, wherein the communication module executes the command to act on the action information using control circuitry configured to:
retrieve, from the storage device associated with the communication module, the stored communication data;
extract, from the stored communication data, the destination information and the communication format;
access a communication interface of the communication module, the communication interface being configured to use the communication format;
input the destination information to the communication interface; and
initiate at the communication interface a communication session to a server associated with the destination information.

18. The system of claim 10, wherein the performance comprises a sporting event and the performer is one of a team or a player, wherein the identification of the trigger comprises one of a team or a player associated with the action information, and wherein the control circuitry is further configured to:
receive an indication of the team or player becoming active in the sporting event;
determine, based on the metadata, that an action period begins at the time the team or player becomes active in the sporting event;
determine, based on the metadata, that the action period ends at a specified time;
compare a current time to the specified time to determine if the specified time has passed; and
based at least in part on determining that the specified time has passed, generate, at the media device, the signal.

* * * * *